(12) United States Patent
Biel, Jr. et al.

(10) Patent No.: US 6,884,398 B1
(45) Date of Patent: Apr. 26, 2005

(54) VACUUM-INSULATED EXHAUST TREATMENT DEVICES WITH RADIALLY-EXTENDING SUPPORT STRUCTURES

(75) Inventors: John P. Biel, Jr., Grand Rapids, MI (US); Frederick B. Hill, Jr., Rockford, MI (US); Lance Mews, Caledona, MI (US); Donald R. Rigsby, Jenison, MI (US)

(73) Assignee: Benteler Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/889,620
(22) PCT Filed: Jan. 21, 2000
(86) PCT No.: PCT/US00/01499

§ 371 (c)(1),
(2), (4) Date: Jul. 19, 2001

(87) PCT Pub. No.: WO00/43105

PCT Pub. Date: Jul. 27, 2000

Related U.S. Application Data

(60) Provisional application No. 60/116,828, filed on Jan. 22, 1999.

(51) Int. Cl.[7] .................. B01D 53/34; B01D 53/92; B01D 53/94; F01N 3/28; F01N 7/14
(52) U.S. Cl. .................. 422/179; 422/177; 422/180
(58) Field of Search ................... 422/168–177, 422/179, 180; 60/299

(56) References Cited

U.S. PATENT DOCUMENTS

| | | | |
|---|---|---|---|
| 3,167,159 A | 1/1965 | Bovenkerk | 165/276 |
| 3,823,305 A | 7/1974 | Schroder | 219/365 |
| 4,795,615 A | 1/1989 | Cyron et al. | 422/179 |
| 5,163,289 A | 11/1992 | Bainbridge | 60/274 |
| 5,318,108 A | 6/1994 | Benson et al. | 165/96 |
| 5,380,501 A | 1/1995 | Hitachi et al. | 422/180 |
| 5,419,876 A | 5/1995 | Usui et al. | 422/177 |
| 5,477,676 A | 12/1995 | Benson et al. | 60/274 |

Primary Examiner—Hien Tran
(74) Attorney, Agent, or Firm—Price, Heneveld, Cooper, DeWitt & Litton LLP

(57) ABSTRACT

An exhaust treatment device, such as a catalytic converter assembly (20) for vehicles includes an inner housing (21) having an inlet and an outlet defining a longitudinal direction (63) and having a catalytic material (27, 27') therein chosen to reduce undesirable emissions from the exhaust of a combustion engine as the exhaust passes from the inlet to the outlet. The catalytic converter assembly (20) further includes an outer housing (22) enclosing the inner housing (21) but characteristically not contacting the inner housing (21), the outer housing (22) including an inlet and an outlet that align with the inlet and outlet of the inner housing (21), the inner and outer housing (21, 22) including walls (30, 31) forming a sealed cavity (26) around the inner housing (21), the cavity (26) having a vacuum drawn therein. The catalytic converter assembly (20) further includes supports (25) of various configurations and materials that extend radially between the inner and outer housings (21, 22).

22 Claims, 18 Drawing Sheets

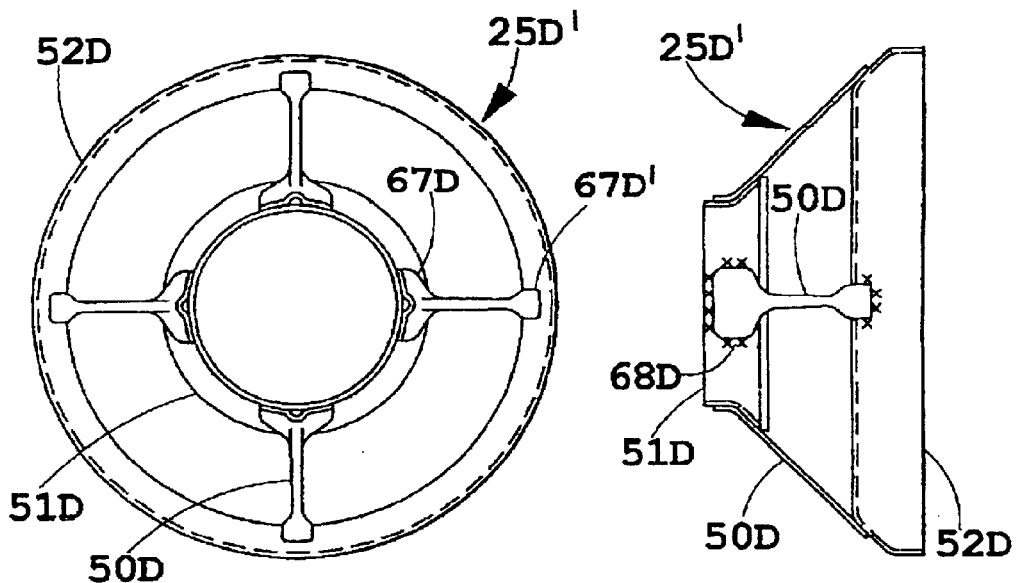
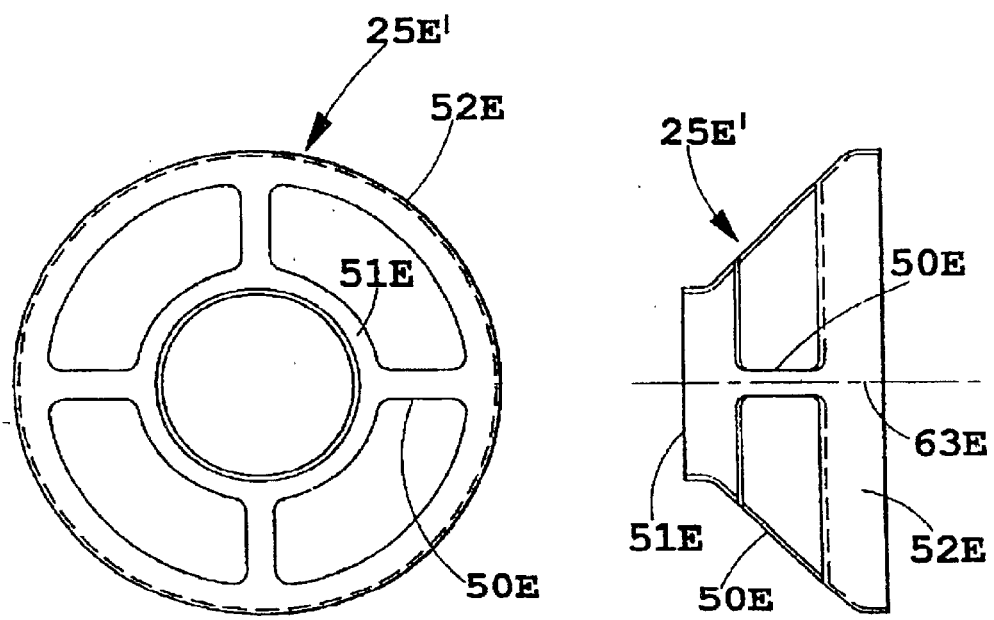

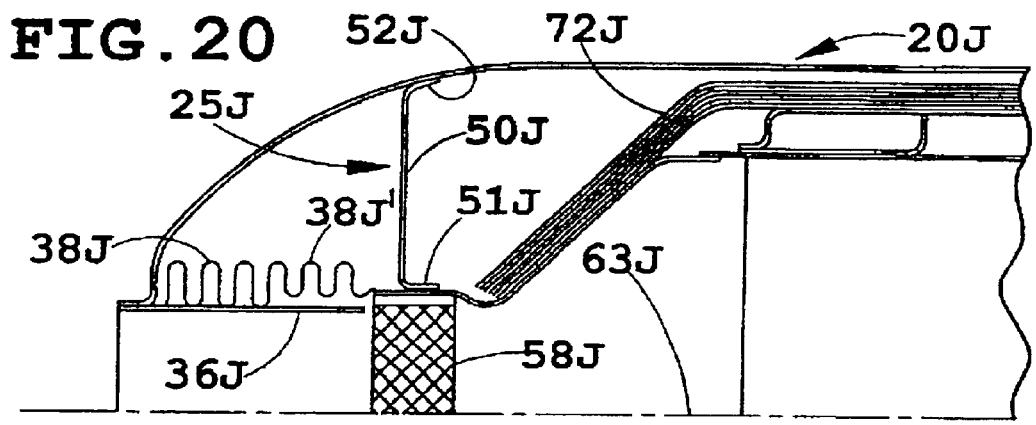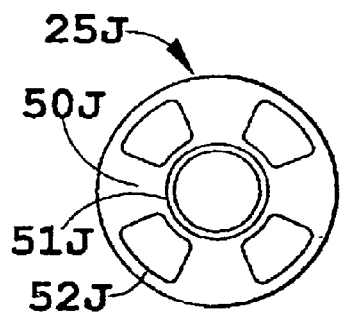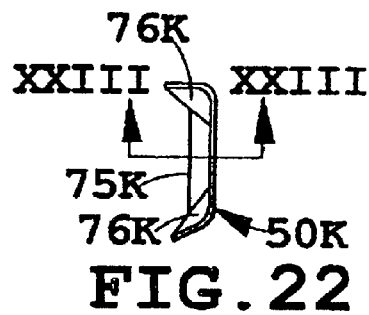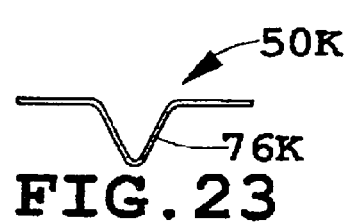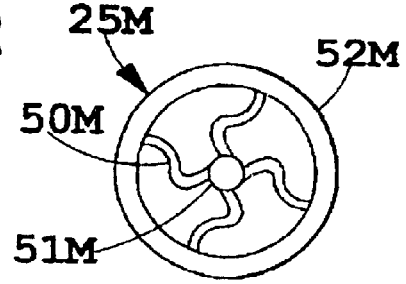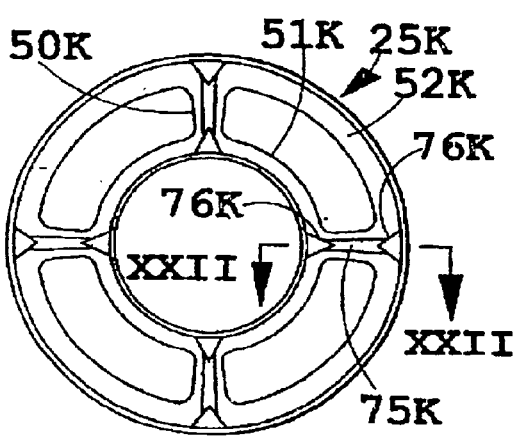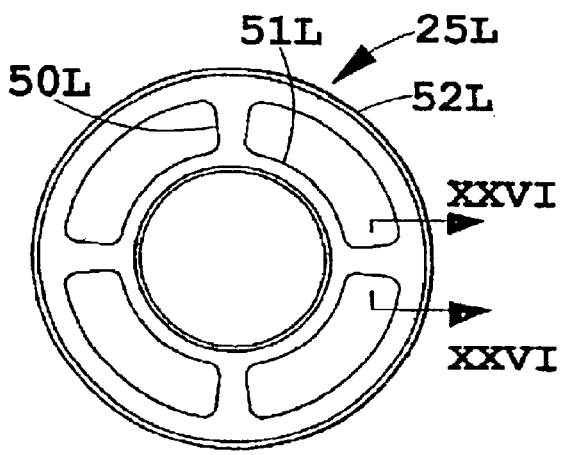

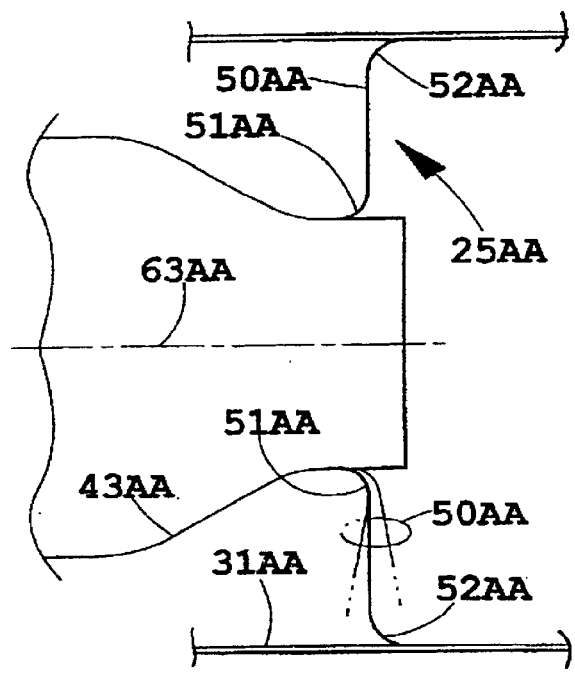
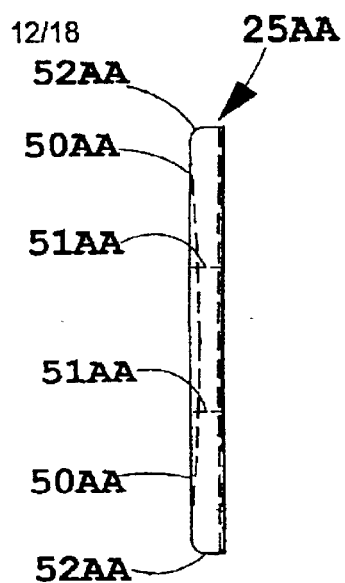
FIG. 51
FIG. 53
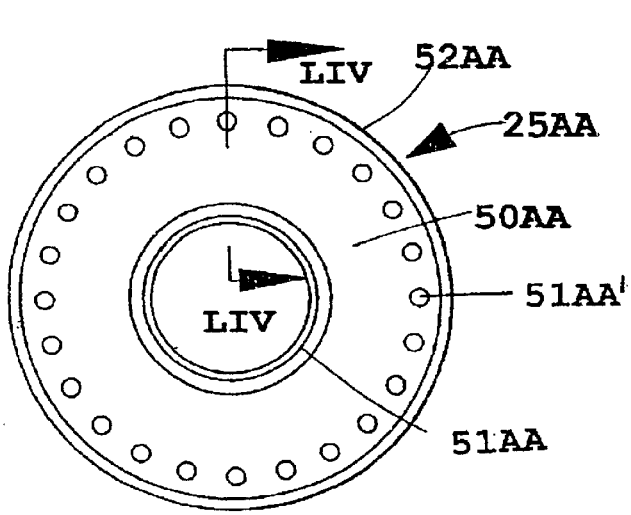
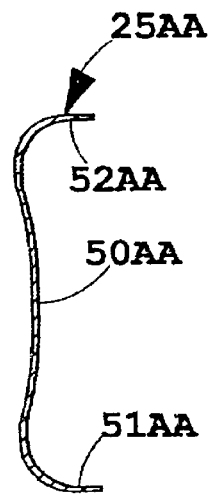
FIG. 52
FIG. 54

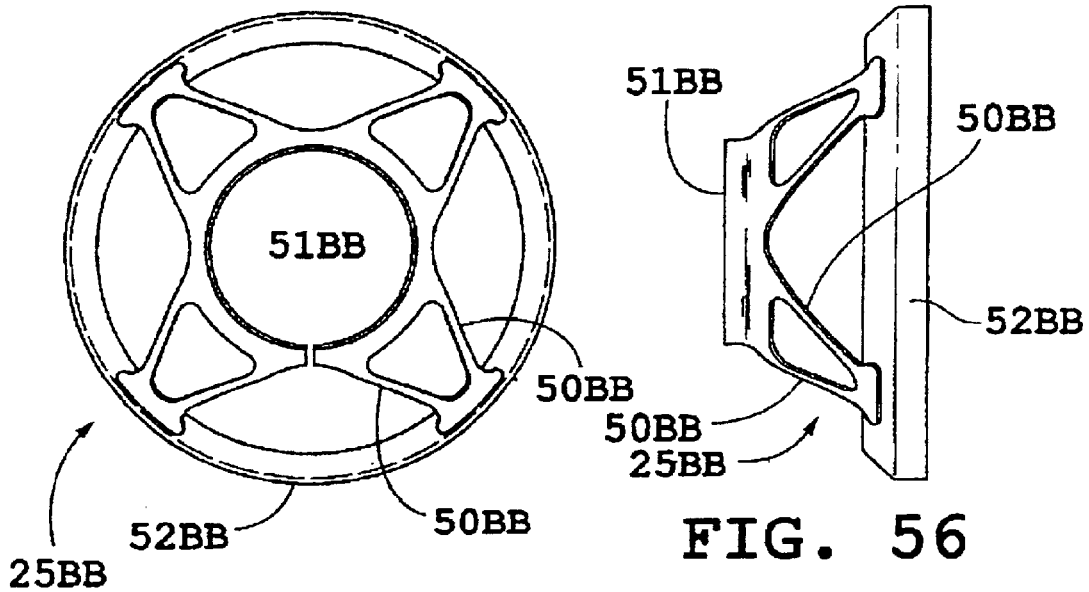
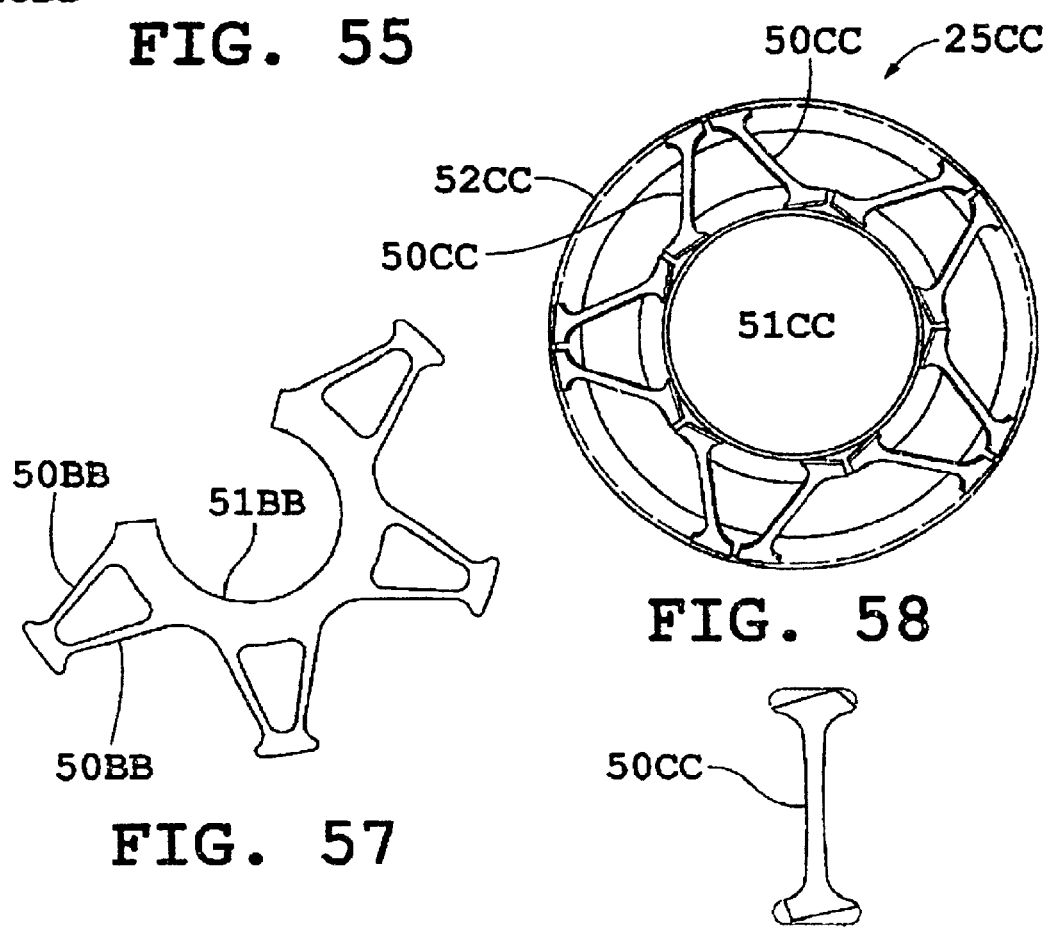
FIG. 55
FIG. 56
FIG. 57
FIG. 58
FIG. 59

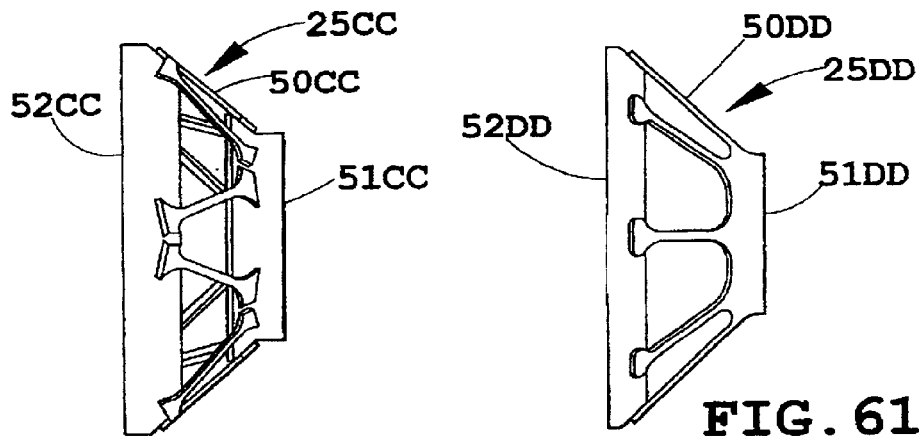
FIG. 60
FIG. 61
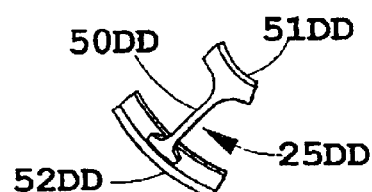
FIG. 62
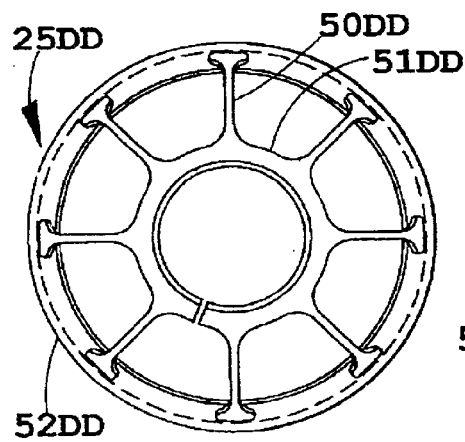
FIG. 63
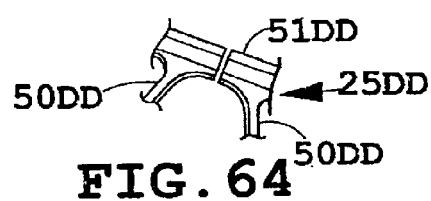
FIG. 64
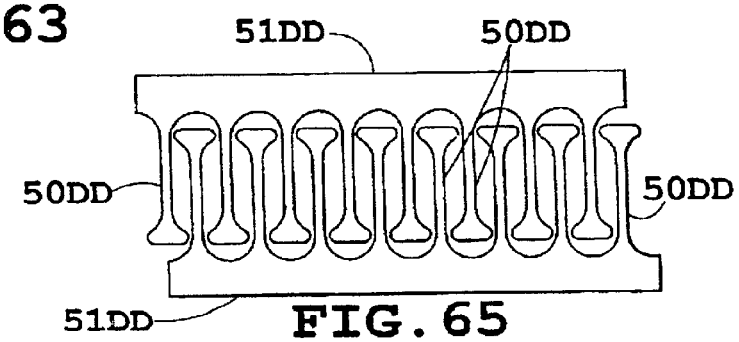
FIG. 65

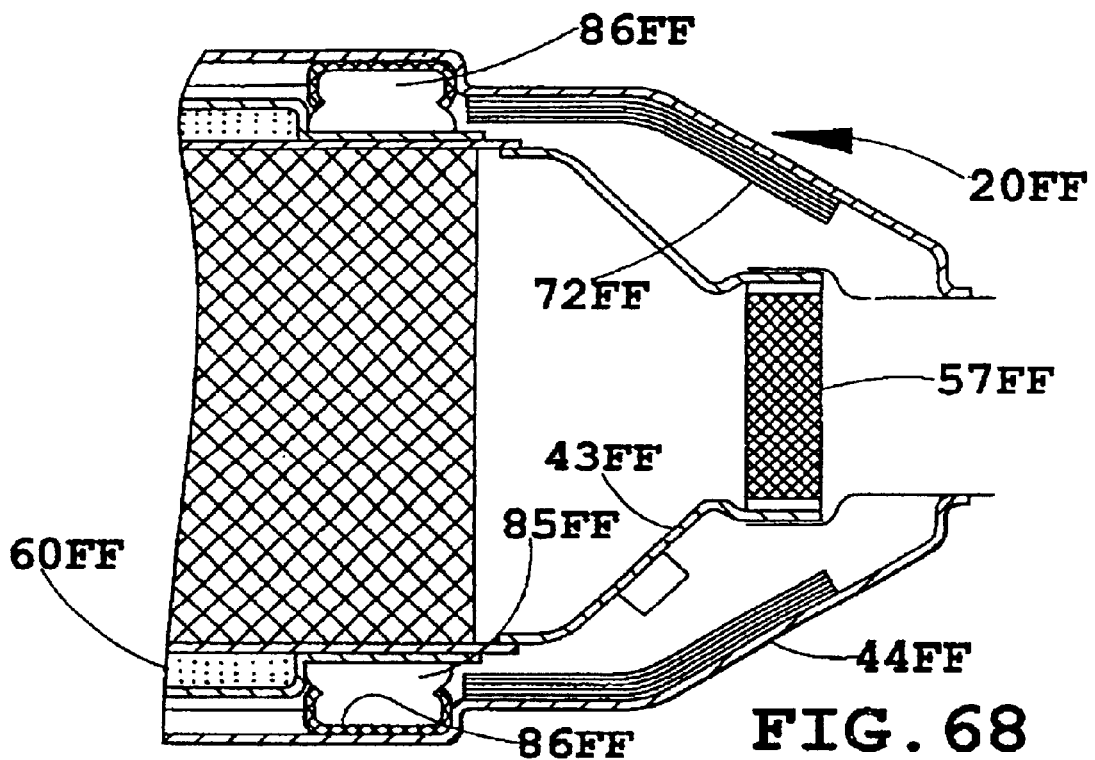
FIG. 68
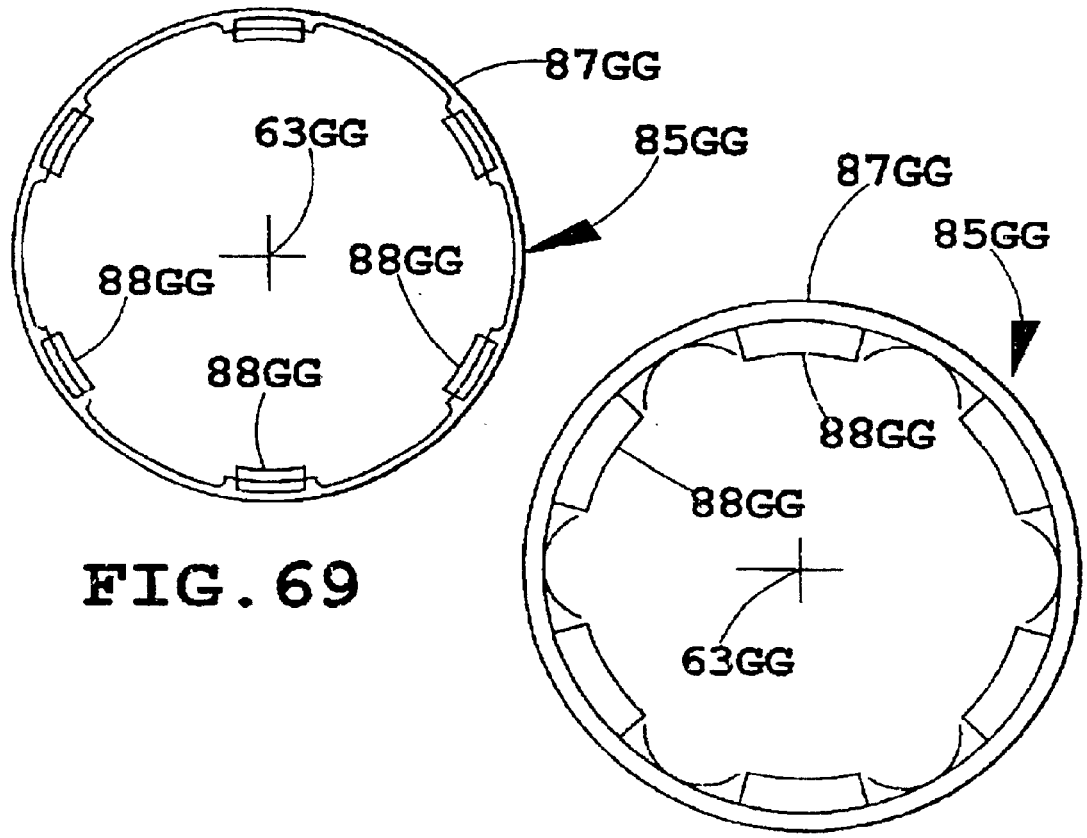
FIG. 69
FIG. 70

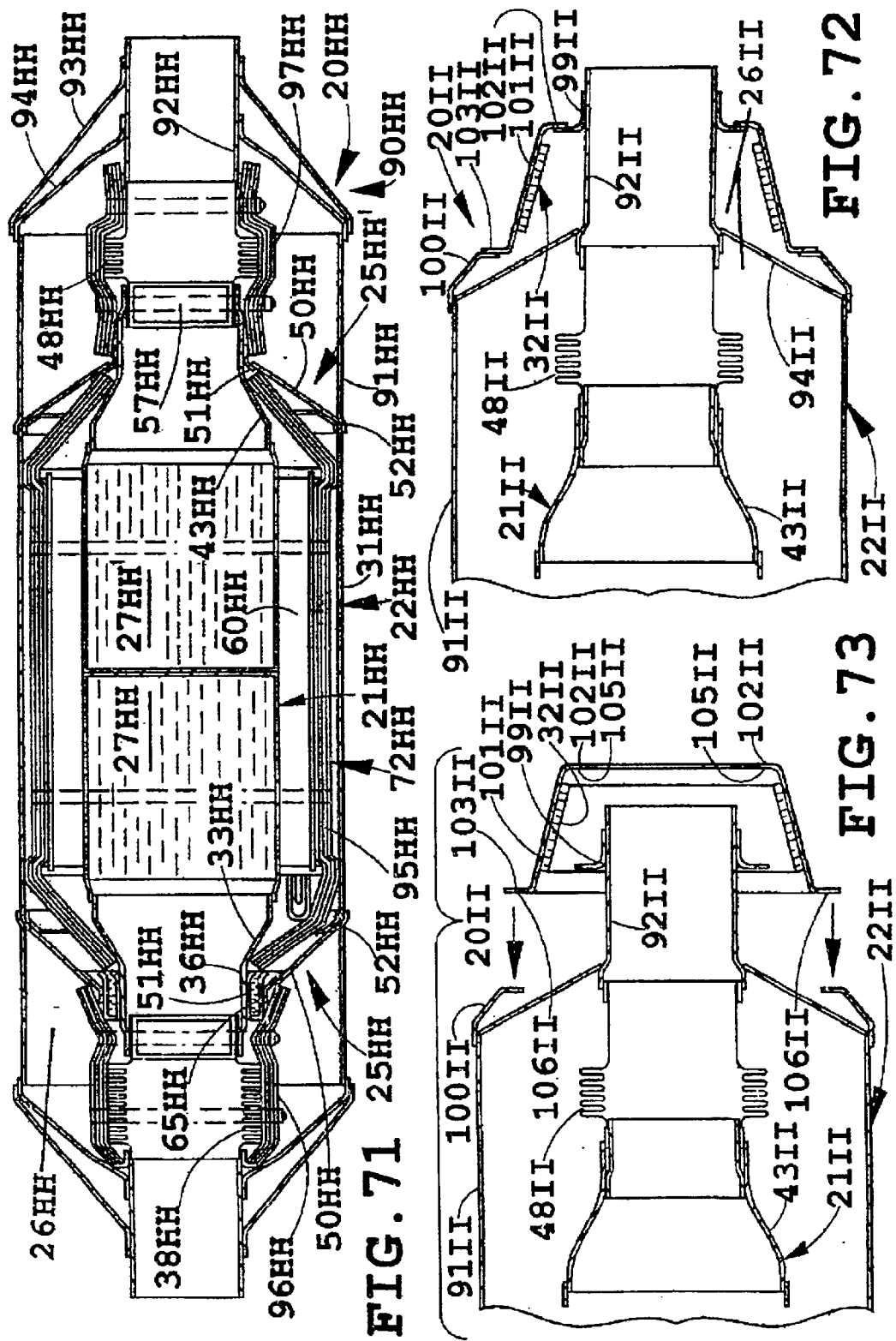

VACUUM-INSULATED EXHAUST TREATMENT DEVICES WITH RADIALLY-EXTENDING SUPPORT STRUCTURES

This application claims benefit of 60/116,828 filed Jan. 22, 1999.

BACKGROUND OF THE INVENTION

The present apparatus relates to automotive exhaust systems, and more particularly relates to thermally-activated exhaust treatment devices that are vacuum-insulated and that have expansion joints and supports within the devices designed to accommodate differences in thermal expansion of a "hot" inner housing relative to a "cool" outer housing.

Most vehicle exhaust systems and particularly exhaust systems of vehicles powered by internal combustion engines are equipped with catalytic converters for reducing noxious emissions in exhaust gases. A problem exists in that a large part of tailpipe hydrocarbon emissions occur during the initial cold start phase when the catalytic converter is least effective. Specifically, cold internal combustion engines produce an exhaust having a relatively high concentration of emissions, while "cold" catalytic converters are least able to deal with the emissions because their catalysts are not efficient until they heat up and reach an operating temperature. (See Benson U.S. Pat. No. 5,477,676, col. 1, ln. 48+). One way of improving upon this situation is to keep the catalytic converters hotter for a longer period of time after an engine is shut off, so that the catalytic converter is still hot even if the engine is started hours later after the engine has cooled off.

Vacuum insulation can be a very effective technique to keep the catalytic converters hot for long periods of time because vacuum minimizes heat loss from air/gas convection, leaving only heat loss from radiation and conduction through solids. However, unacceptable amounts of heat loss by radiation and conduction may still occur at locations where an inner housing is supported inside an outer housing of a catalytic converter. Further, it is not easy to consistently and securely support an inner housing within an outer housing without allowing any direct physical contact between the two housings, especially on a production basis. This is because production processes and the manufactured components exhibit variations and have tolerances that make it difficult to maintain a precise and consistent gap between inner and outer housings on all assemblies produced. Further, where a relatively high vacuum is drawn in the space between the inner and outer housings, the problem of maintaining the gap is made significantly more difficult. This is because the existence of the vacuum creates unbalanced forces on the housing sidewalls, and tends to draw and deform the sidewalls of the inner and outer housings toward each other. Further, even if a gap is successfully made that extends completely around the inner housing between the inner and outer housings, differences in thermal expansion can cause contact between the inner and outer housings. The differences in thermal expansion occur because the inner housing is closer to the hot catalytic materials in the catalytic converter, while the outer housing is cooled by the environment. As a result, differences of several millimeters of thermal expansion can occur. Another problem is the abuse that occurs to the catalytic converter when in service under the vehicle, including impacts and shocks from stones and debris and temperature spikes from high speed/load events or engine misfires. On the other hand, any supports that are provided for holding the inner housing in non-contact with the outer housing cannot be so massive and large as to create a thermally conductive path that defeats the effectiveness of the other insulating features. Thus, designing a support system that supports the inner housing in the outer housing in a reliable and stable manner and that at all times prevents contact, yet that does not itself provide unwanted conduction, is not an insignificant or easily solved problem.

Some insulating arrangements include a fibrous insulation that supports inner and outer tubes along their length, with the fibrous insulation providing separation by being physically positioned between the inner and outer tubes at all locations. (See Bainbridge U.S. Pat. No. 5,163,289). This reliably maintains spacing between the inner and outer tubes, but is not satisfactory since it can result in significant heat transfer along the fibers from the inner tubes to the outer tubes. Further, unless there are many fibers or larger fibers with strength, the fibers will crush and not provide a satisfactory insulating value while in service. Still further, fibrous insulation is not inexpensive.

Thermally-activated exhaust treatment devices also include particulate traps for capturing and treating particulate emissions, each as carbon particles and soot from diesel engines. Particulate traps work best at elevated temperature. Particulate traps are least effective at cold starts which is when the problem of carbon particulate emissions and creation of soot is the greatest in diesel engines. Accordingly, there are significant advantages to be achieved in particulate traps by vacuum-insulating them to conserve and hold their temperatures longer on engine shut off.

Accordingly, an exhaust treatment device is desired solving the aforementioned problems and offering the aforementioned advantages, with the structure including supports that provide for minimal thermal conductivity, long service life, and facilitate manufacture.

SUMMARY OF THE INVENTION

In one aspect of the present invention, an exhaust treatment device for vehicles includes an inner housing having an inlet and an outlet defining a longitudinal direction and having a thermally-activated exhaust treatment device therein chosen to reduce undesirable emissions from the exhaust of a combustion engine as the exhaust passes from the inlet to the outlet. An outer housing encloses the inner housing but characteristically does not contact the inner housing. The outer housing includes an inlet and an outlet that align with the inlet and outlet of the inner housing, and further the inner and outer housing include walls forming a sealed cavity around the inner housing. The cavity has a vacuum drawn therein. Supports comprising a plurality of spokes are provided that extend radially between the inner and outer housings.

In another aspect of the present invention, an exhaust treatment device for vehicles includes an inner housing having an inlet and an outlet defining a longitudinal direction and having a thermally-activated exhaust treatment device therein chosen to reduce undesirable emissions from the exhaust of a combustion engine as the exhaust passes from the inlet to the outlet. An outer housing encloses the inner housing but characteristically does not contact the inner housing. The outer housing includes an inlet and an outlet that align with the inlet and outlet of the inner housing. The inner and outer housing include walls forming a sealed cavity around the inner housing, the cavity having a vacuum drawn therein. Supports are provided that support the inner housing in the outer housing, the supports each including a body and a foot that engages at least one of the inner and outer housing. The foot includes insulative material different from the supports that is chosen to minimize conductance of heat. In a narrower form, the feet include insulative material selected from one of wire mesh, ceramic, a composite or similar structurally-rigid high temperature stable insulative material.

In another aspect of the present invention, an exhaust treatment device for vehicles includes an inner housing having an inlet and an outlet defining a longitudinal direction and having a thermally-activated exhaust treatment device therein chosen to reduce undesirable emissions from the exhaust of a combustion engine as the exhaust passes from the inlet to the outlet. An outer housing encloses the inner housing but characteristically does not contact the inner housing. The outer housing including an inlet and an outlet that align with the inlet and outlet of the inner housing, the inner and outer housing including walls forming a sealed cavity around the inner housing, the cavity having a vacuum drawn therein. Supports are provided that support the inner housing in the outer housing. The supports include a radially-extending body and including a foot that slidably engages at least one of the inner and outer housing.

These and other features, advantages, and objects of the present invention will be further understood and appreciated by those skilled in the art by reference to the following specification, claims and appended drawings.

DESCRIPTION OF DRAWINGS

FIGS. 6–7, FIGS. 8–9, FIGS. 10–11, FIGS. 12–13, and FIGS. 14–15 are paired figures that are similar to FIGS. 4–5, respectively, with each pair of these figures showing an end view and a side view of a modified end support that includes radially-extending spoke-like legs adapted to provide secure radial support but to permit dissimilar longitudinal thermal expansion between inner and outer housings;

FIG. 19 is an end view of another modified support;

FIG. 20 is a fragmentary side cross-sectional view of a modified catalytic converter incorporating the support shown in FIG. 19;

FIG. 21 is an end view of another modified support;

FIG. 22 is a cross-sectional view taken along line XXII—XXII in FIG. 21;

FIG. 23 is a cross-sectional view taken along line XXIII—XXIII in FIG. 22;

FIG. 24 is a cross-sectional view of a modified spoke, FIG. 24 being similar to FIG. 23;

FIG. 25 is an end view of another modified support;

FIG. 26 is a cross-sectional view taken along the line XXVI—XXVI in FIG. 25;

FIG. 27 is an end view of another modified support;

FIG. 51 is a fragmentary side cross-sectional view of another modified catalytic converter incorporating a modified support;

FIG. 52 is an end view of the modified support shown in FIG. 51;

FIG. 53 is a side view of the modified support shown in FIG. 52;

FIG. 54 is an enlarged cross-sectional view taken along line LIV—LIV in FIG. 52;

FIG. 55 is an end view of another modified support;

FIG. 56 is a side view of a modified support shown in FIG. 55;

FIG. 57 is a flat stamping for forming a crown-shaped portion of the support shown in FIG. 57;

FIG. 58 is an end view of another modified support;

FIG. 59 is a plan view of a spoke forming a portion of the modified support in FIG. 58;

FIG. 60 is a side view of the modified support shown in FIG. 58;

FIG. 61 is a side view of another modified support;

FIG. 62 is a fragmentary view of one of the spokes and related areas on the modified support of FIG. 61;

FIG. 63 is an end view of the modified support shown in FIG. 61;

FIG. 64 is an enlarged view of the circled area labeled LXIV in FIG. 63;

FIG. 65 is a plan view of a stamping forming two of the spoke portions of FIG. 63;

FIG. 68 is an enlarged fragmentary side cross-sectional view of the modified catalytic converter of FIG. 67;

FIGS. 69 and 70 are cross-sectional view of the support ring in FIG. 68 taken along a plane that extends perpendicular to the longitudinal direction of the catalytic converter;

FIG. 71 is a side cross-sectional view of a modified catalytic converter having a modified spoke support system that facilitates manufacture;

FIG. 72 is an enlarged fragmentary view of a modified end construction similar to the end construction of the converter shown in FIG. 71;

FIG. 73 is an exploded view of FIG. 72; and

DETAILED DESCRIPTION OF PREFERRED EMBODIMENTS

Figure 1:
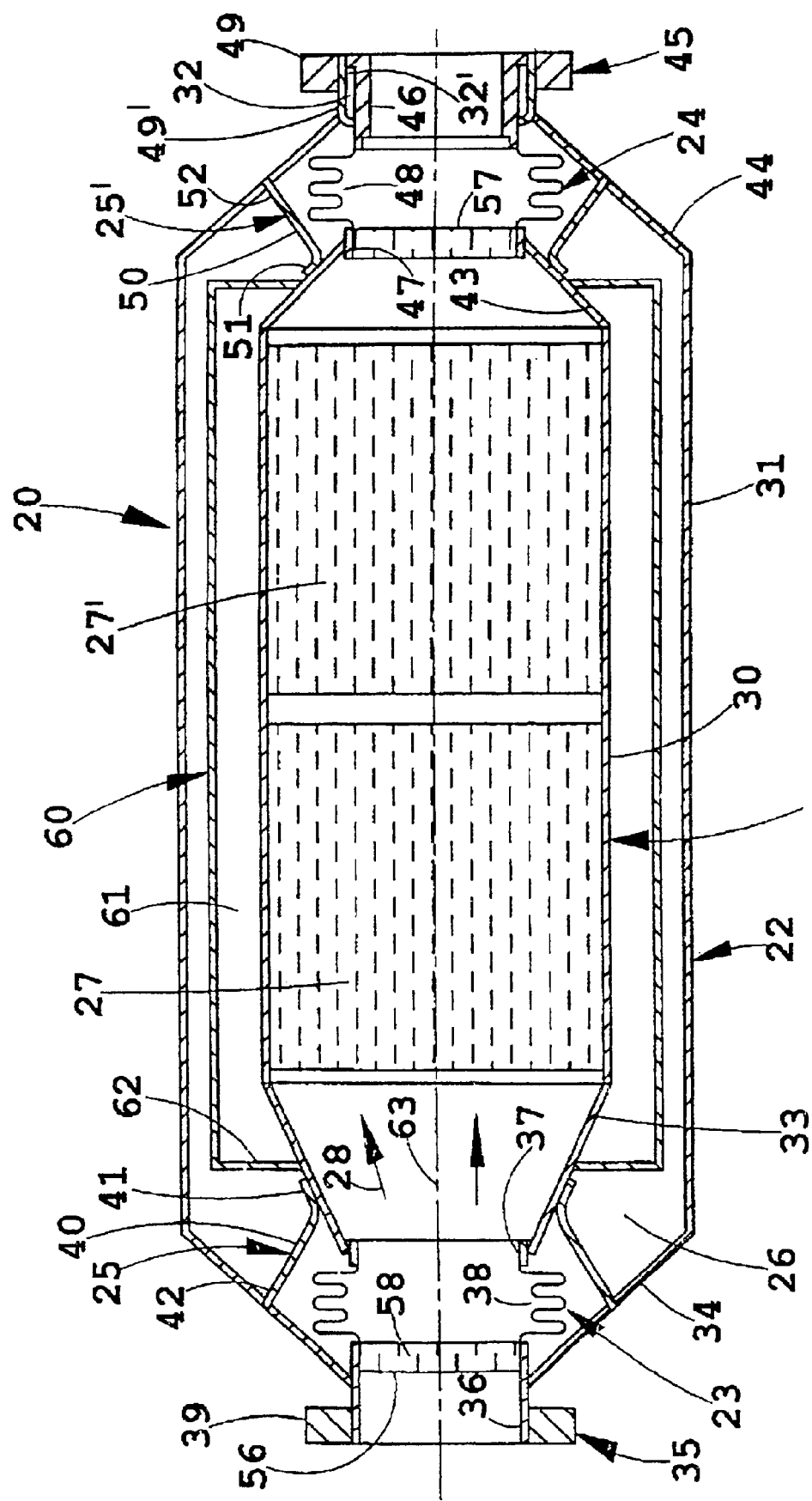
FIG. 1 discloses a side cross-sectional view of a catalytic converter including radially-extending spoke-like supports supporting an inner housing in a non-contacting position within an outer housing.

The illustrated catalytic converter 20 (FIG. 1) is a vacuum-insulated converter having a core or inner housing 21 positioned within and insulated from a jacket or outer housing 22. Expansion joints 23 and 24 are provided at each end of the inner housing 21, and supports 25 and 25' are provided to support the inner housing 21 within the outer housing 22 while maintaining a vacuum-insulating cavity 26 forming a relatively constant gap around the inner housing 21. A sufficient vacuum is drawn on the cavity 26 so as to eliminate heat loss from air conduction and convection. The supports 25 and 25' within the converter design are particularly configured to accommodate longitudinal thermal expansion of the hot inner housing 23 relative to the cool outer housing 24. The internal supports 25 and 25' bridge the vacuum insulation and are sufficiently stiff to accommodate dynamic (vibration and impact) loads at temperature, yet are flexible enough to accommodate unequal thermal expansion of the inner and outer housings 21 and 22, and further are of minimal cross section size and minimal conductance to minimize heat loss.

More specifically, the inner housing 21 is preferably fabricated of metal or other material that is impermeable to gases, and is adapted to contain one or more catalyst substrates 27 and 27'. Exhaust gases from an internal combustion engine flow through the catalytic converter 20, as indicated by the arrows 28, including through the numerous small, catalyst-coated pores of channels that are formed in the catalytic substrates 27 and 27'. The inner housing 21 is enclosed within the outer housing 22, and its sidewall 30 is spaced radially inwardly from the sidewall 31 of the outer housing with the supports 25 and 25' supporting it to maintain a relatively constant gap. The outer housing 22 is also preferably fabricated of metal or other material that is impermeable to gases, even in hot and high-order vacuum environments. The annular space or cavity 26 formed between the inner and outer housings 21 and 22 is evacuated to form a sufficient vacuum. The insulating performance of the cavity 26 is variably-controlled by a temperature-sensitive hydrogen-source device 32 that includes hydride material, and the vacuum is maintained by a vacuum maintenance device 32' that includes a getter material.

A funnel-shaped inner inlet end cone 33 is attached to the inlet end of the sidewall 30 of the inner housing 21, and a funnel-shaped outer inlet end cone 34 is attached to the inlet end of the sidewall 31 of the outer housing 22. An inlet subassembly 35 includes an inlet tube section 36 attached to the open end of the outer inlet end cone 34, and an inlet tube section 37 attached to the open end of the inner inlet end cone 33. A bellows 38 is attached between the inboard and outboard inlet tube sections 36 and 37, the bellows 38 being configured to allow dissimilar longitudinal thermal expansion of the inner and outer housings 21 and 22. An end of the inlet tube section 36 projects from the outer inlet end cone 34, and an annular attachment flange 39 is secured to the inlet tube section 36 for attaching the catalytic converter 20 to an engine exhaust pipe. The illustrated supports 25 extend from the outer inlet end cone 34 to the inner inlet end cone 33 at a plurality of circumferentially-spaced positions. The supports 25 include spokes 40, a hub flange 41, and a rim flange 42, that abut and are joined to the inner and outer inlet end cones 33 and 34.

A funnel-shaped inner outlet end cone 43 is attached to or formed in the outlet end of the sidewall 30 of the inner housing 21, and a funnel-shaped outer outlet end cone 44 is attached to or formed in the outlet end of the sidewall 31 of the outer housing 22. An outlet subassembly 45 includes an outlet tube section 46 attached to the open end of the outer outlet end cone 44, and an outlet tube section 47 attached to the open end of the inner outlet end cone 43. A bellows 48 is attached between the inlet and outlet tube sections 46 and 47, the bellows 48 being configured to allow dissimilar longitudinal thermal expansion of the inner and outer housings 21 and 22. An end of the outlet tube section 46 projects from the outer outlet end cone 44. It includes a tube 49' shaped to from an annular space for holding getter and hydride material. An exhaust pipe attachment flange 49 is secured to the outlet tube section 46 for attaching the catalytic converter 20 to an engine exhaust pipe. The illustrated supports 25' extend from the outer outlet end cone 44 to the inner outlet end cone 43 at a plurality of circumferentially spaced positions. The supports 25' include spokes 50, a hub flange 51 and a rim flange 52 that abut and are welded to the inboard and outboard inlet end cones 43 and 44. The illustrated reinforcement tube 49' and outlet tube section 46 are fixed together, and defines a space 49" therebetween filled with getter an/or hydride material. The hydride material captures hydrogen from the insulating cavity 26 when the catalytic converter 20 is at low temperature to increase the insulation effect of the vacuum at low temperature (which helps the catalytic converter reach the operating temperature more quickly) and release hydrogen to increase conductivity when the catalytic converter 20 is at a high temperature (to prevent over-heating). The relationship between the insulative value and the pressure of hydrogen is known in the art, such that it doesn't need to be described here for an understanding of the present invention by a person skilled in this art. The getter material removes gases from the cavity 26, and helps maintain the high vacuum in the cavity 26 for a longer service life. It is noted that many different getter/hydride arrangements and structures are possible, as shown in provisional application Ser. No. 60/116,829, previously incorporated herein by reference.

End shields 56 and 57 are placed in the inlet and outlet outer tube sections 36 and 46, respectively, adjacent an outer end of the bellows 38 and 48. The end shields 56 and 57 include a plurality of holes 58 that reduce turbulence in the flow of exhaust gases through the catalytic converter 20, and also the end shields 56 and 57 slow convection heat transfer and help retain the heat within the catalytic converter 20 when the flow of exhaust stops. Further the end shields 56 and 57 may include catalytic material themselves if desired.

A phase-change material (PCM) containing housing 60 including annular end walls 62 is attached to the sidewall of the inner housing 21 in the cavity 26, and forms a sealed separate chamber around the inner housing 22. Phase change material 61 is placed in the chamber of housing 60. The phase change material 61 is formulated to change its phase and store heat during the heat-up period of the catalytic converter, and further is configured to release heat during cool-down of the catalytic converter 20. The result is that the phase change material 61 causes the inner housing 21 and catalytic materials in the substrates 27 and 27' to reach their "light-off" temperatures much more quickly. Once the catalytic materials reach the "light-off" temperature (usually about 315–430 degrees C.), the temperature of the catalytic converter 20 raises rapidly to its operating temperature from the exothermic heat of the catalytic reactions with the exhaust gases.

The outer inlet end cone 34 forms an angle to a longitudinal direction, and the inner outlet end cone 33 forms an angle to the longitudinal direction 63, with both the outer and inner inlet end cones opening up as the exhaust gases flow into the catalytic converter 20. The spokes 40 of the illustrated supports 25 at the inlet end extend at an angle of heat of about 45 degrees from the longitudinal direction 63 such that they interconnect the cones 33 and 34. It is noted that the spokes 50 can point inboard or outboard and be connected to other components, e.g. outer housing 22. The spokes 50 of the illustrated supports 25' at the outlet end extend at an angle of about 45 degrees from the longitudinal direction 63, such that they interconnect the cones 43 and 44. The spokes 40 and 50 of the supports 25 from spokes that are circumferentially-spaced around the bellows 38 and 48, and there are sufficient spokes 40 and 50 such that the inner housing 21 is stably supported within the outer housing 22 for non-contacting concentric support. The appearance in end view is much like a spoked wheel. The combination of the spoke-like bodies 40 with the cones 33 and 34 at the inlet end, and the spoke-like bodies 50 with the cones 43 and 44 at the outlet end, form a support structure capable of maintaining support on the inner housing 21 while still accommodating the different thermal expansion of the inner housing 21 relative to the outer housing 22 (particularly in a longitudinal direction). As illustrated, the spoke-like bodies or spokes 40 at the inlet end are longer than the spoke-like bodies 50 at the outlet end. A scope of the present invention is believed to include both configurations, and variations thereof.

When the catalytic converter 20 is in a cooled state, and the exhaust gases begin to flow (i.e., when the engine is turned on), the inner and outer housings 21 and 22 will gradually heat, with the inner housing 21 heating much sooner and faster. As it heats, the inner housing 21 will lengthen by several millimeters, such as about 4-mm, ahead of the outer housing 22. The outer housing 22 also heats, but at a slower rate and with a delayed time period and also to a lower highest temperature. This causes longitudinally-directed stress to occur on the supports 25 and 25'. The curvature of attachment hub flanges 41 and 51 to the spokes 40 and 50, respectively, and their general shape and angular attachment cause the spokes 40 and 50 to bend into a curvilinear/concave shape, and causes them to do so simultaneously and predictably as the inner and outer housings 21 and 22 undergo different thermal expansions. The pressure of supports 25 and 25' can also cause the outlet end cones 43 and 44 to bow slightly apart from each other, depending on the strength of the supports 25 and 25'. By this predictable bending, the cavity 26 is reliably maintained around the inner housing 21 such that it does not contact the outer housing 22. The cross-sectional shape of the supports 25 and 25' is made sufficient to provide the functional strength required to hold the inner housing 21 in its isolated position within the outer housing 22, but the cross-sectional shape is minimized to reduce heat transfer along the supports 25 and 25'. The cross-sectional shape of the supports 25 and 25' vary greatly depending upon a weight of the inner housing 21 and components therein, depending upon loading (vibrational and impact) test requirements of the vehicle manufacturer, and depending upon test results and fine-tuning of the exhaust system on a given model vehicle. For example, the spokes can be made from 1.5 mm thick by 4-mm wide stainless steel material where at least three or more supports 25 (and 25') are used circumferentially around the inlet and outlets of the catalytic converter 20.

Figure 2:
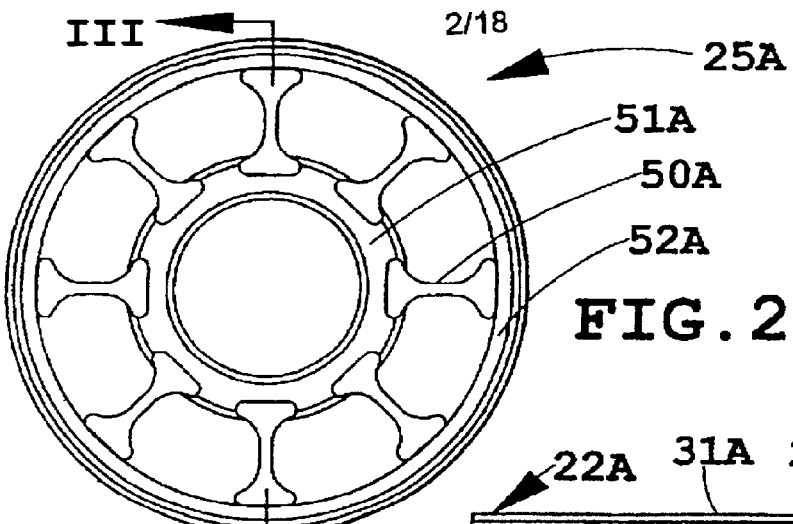
FIG. 2 is an end view of a modified end support including radially-extending spokes and an outer ring with a wire mesh foot.

It is noted at this point, that a potentially more consistent and stable support can be achieved by the support arrangements shown in FIGS. 2–73. Nonetheless, it is noted that FIG. 1 shows a good and useful structure that is believed to be satisfactory in many applications.

A plurality of modified catalytic converters are disclosed below. In order to reduce redundant discussion, each successive modification uses the same identification numbers as the earlier described embodiment, but with the addition of a letter, such as "A", "B", "AA", and etc.

Converter Internal Support/Wire Mesh Ring End Support Design

Figure 3:
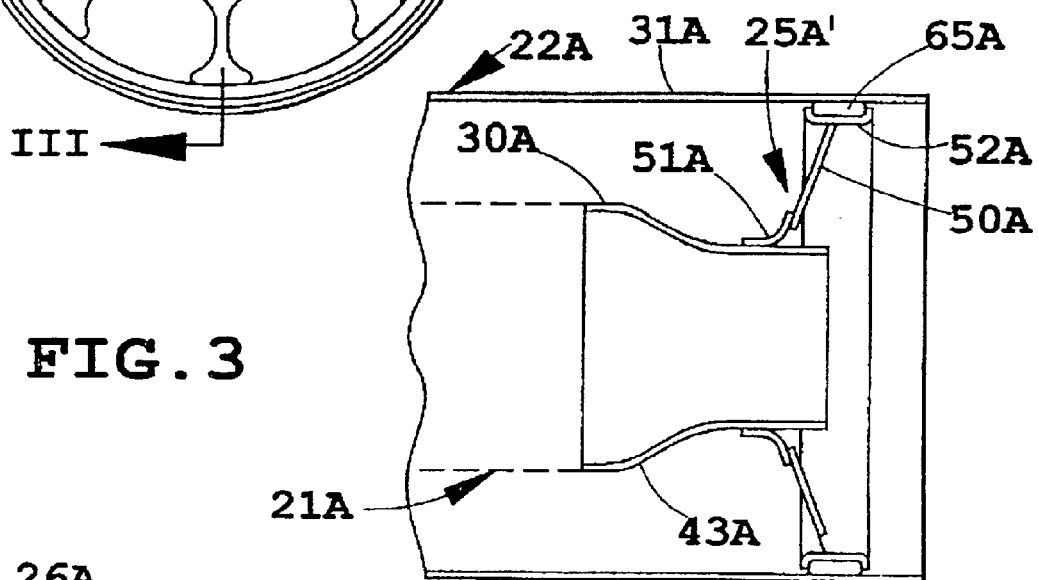
FIG. 3 is a cross-sectional view taken along the line III—III in FIG. 2.
Figure 3A:
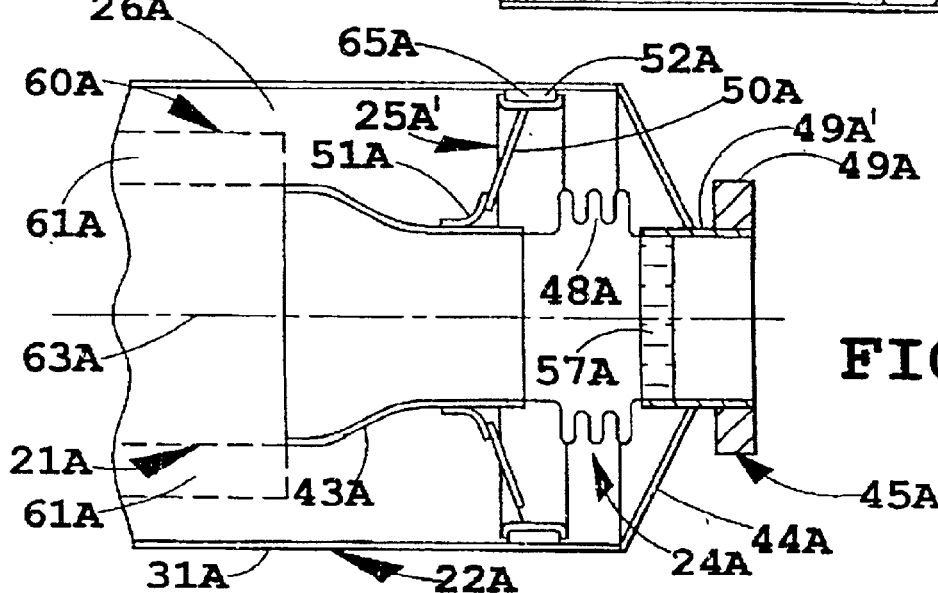
FIG. 3A is a cross-sectional view similar to FIG. 3, but also showing an outlet end of the modified catalytic converter of FIG. 3.

A wire mesh ring or foot 65A (FIGS. 2–3A) can be used as an integral component of an end support 25A' to allow the end supports 25A' to move relative to the inner or outer housings 21 and 22. The wire mesh supports one end of the converter core or roughly 50% of its weight. A highly compressed wire mesh ring acts as a high rate spring for any loads in any radial direction. However, it allows moderate axial sliding of the converter due when inner housing 21 of the converter undergoes thermal expansion. The wire mesh is built of a premium material like stainless steel or Inconel that is compatible with other mating components. For example, a high nickel stainless steel alloy such as 30% nickel can be used. This supports and positions the converter core for high durability, and allows for axial and radial thermal growth. A sliding joint with an end support employing a wire mesh end, a jacket tube, a core outlet and an end support of dog bone shape spokes is set forth in FIGS. 2 and 3. The illustrated wire mesh-sliding joint engages the outer housing 22 and is positioned against the jacket internal diameter. This results in about twice as much wire mesh mounting area than if it were engaged against the inner housing 21. At the jacket or outer housing 22, the operating temperatures are much lower and the wire mesh can be a lower grade stainless steel material.

More specifically, the support 25A' (FIG. 3A) includes an inner (hub) ring or hub flange 51A, and outer (rim) ring or flange 52A, and a plurality of spoke-like bodies 50A welded to the inner and outer rings 51A and 52A. The cone 43A is "bullet"-shaped to facilitate manufacture and flow distribution. The outer ring 52A forms an outwardly facing recess in which the wire mesh foot 65A is placed. The wire mesh foot 65A forms a zone of low thermal conductivity, thus resisting transfer of thermal energy from the inner housing 21A to the outer housing 22A. The wire mesh 65A slidably engages the sidewall 31A, such that the inner housing 21A is stably supported, yet allowed to grow longitudinally due to dissimilar thermal expansion. The illustrated spoke-like bodies 50A extend at an angle of about 70 degrees to the longitudinal direction 63A, and press against the wire mesh foot 65A, with the foot 65A pressing back with a spring-like force. Notably, it is contemplated that the foot 65A could also be made of other materials, such as ceramic, if desired.

Figure 4:
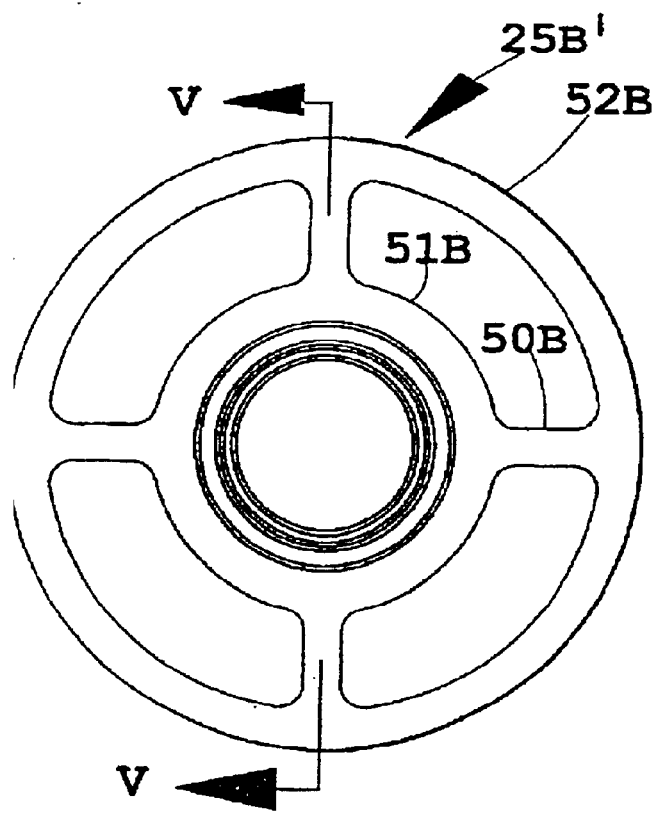
FIG. 4 is an end view of a modified end support.
Figure 5:
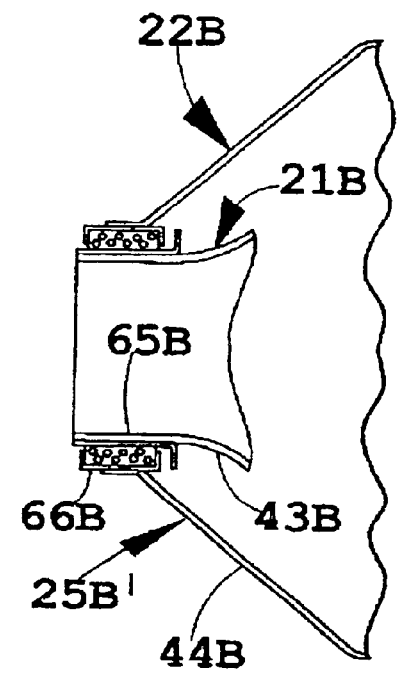
FIG. 5 is a cross-sectional view taken along the line V—V in FIG. 4, including showing the inner and outer housing ends.

The support 25B' (FIGS. 4–5) includes a body 50B similar to the body 50 of support 25B', but the body inner flange 51B includes an inwardly facing ring-shaped recess 66B in which a wire mesh foot 65B is positioned. The wire mesh foot 65B slidably engages the end of the inner end core 43B. The wire mesh foot 65B must be made of a thermally resistant stainless steel since the foot 65B engages the inner housing 21B, but less of the wire mesh material is needed due to the smaller diameter of the inner housing 21B. The body 50B and the inner and outer flanges 51B and 52B are stamped as a single stamping, and are integrally formed as a single unit, without the need for secondary welding. Four bodies 50B are shown, although more or less could be designed into the support 25B'.

Converter Internal Support/Dog Bone Spoked End Support Designs

Figure 6:
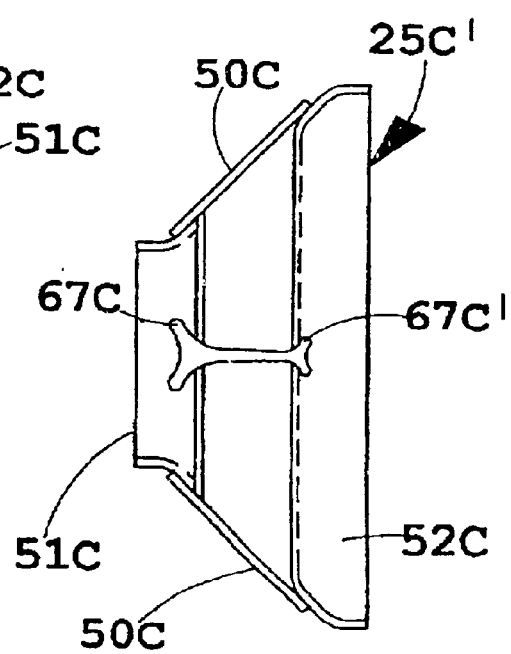
Figure 7:
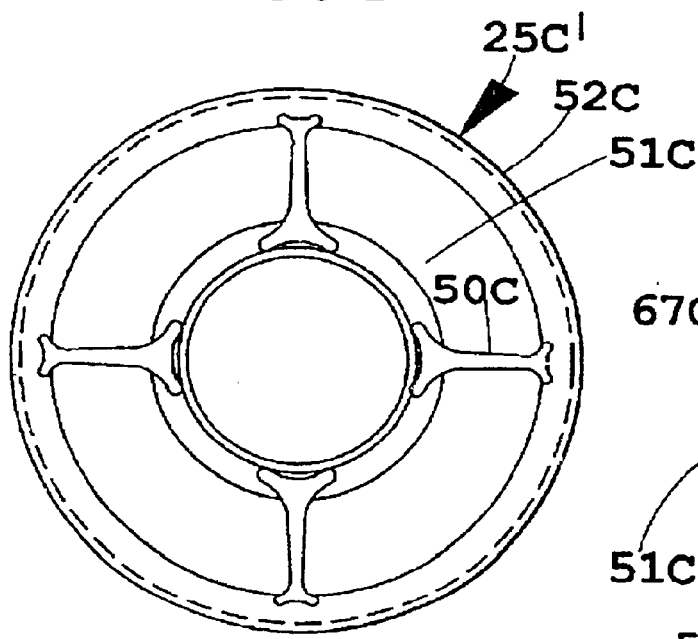

A scope of the present invention includes a plurality of supports 50C including "dog bone" shaped support bodies 50C (FIGS. 6–7) connecting inner and outer ring flanges 51C and 52C placed at each end of the inner housing (21) and the converter core. The inner and outer flanges 51C and 52C are shaped to mateably engage the outlet (or inlet) end cones (33 and 34) of the inner and outer housings (21 and 22). The dog bone shaped support bodies 50C include enlarged inner and outer pad flanges 67C and 67C' with wide side-laterally-extending fingers shaped to facilitate joining to the inner and outer ring flanges 51C and 52C. The bodies 50C have a reduced width to minimize the cross-section, which in turn minimizes the heat conductance along the cross section. This arrangement entirely supports the inner housing 21C and converter cone components housed therein. It is contemplated that a quantity of dog bone shaped parts could be utilized at three to ten locations equally spaced radially around the support ring or at offset locations chosen to best resist vehicle loads. The dog bone shape parts entirely support the converter core. A premium material like stainless steel such as Inconel would preferably be used for the dog bone shape because it has very high strength at an elevated operating temperature, and lower thermal conductivity than other nickel alloyed stainless steels. A minimum cross section would be utilized to keep heat loss to a minimum. Because the dog bone could be easily manufactured of various shapes, perhaps by stamping methods, an optimum shape can be designed, analyzed, tested and developed. A unique large shape at each end can be built that is good for welding or brazing, and that handles structural loads better than a small shape at each end. The intermediate portion of the dog bone shape can be designed so that it is larger or of better configuration only where needed to offset or handle localized high structural loads or other problems. This is to support and position converter core for high durability and minimum head loss. It is noted that a cross section of the body 50C can be relatively flat, or the cross section can be made U-shaped or V-shaped for added stiffness.

Figure 13:
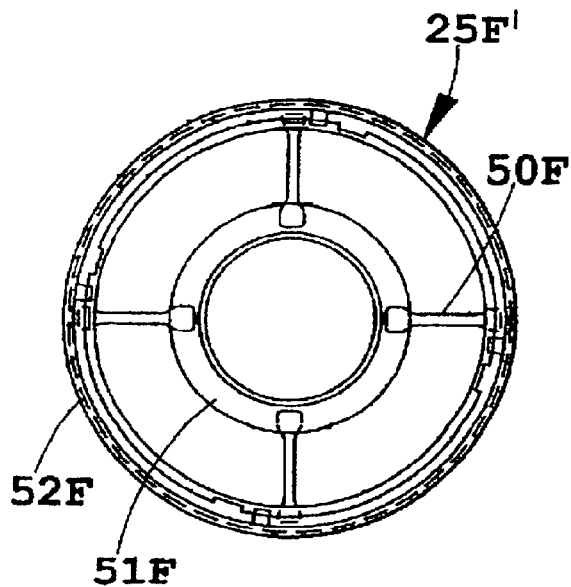
Figure 12:
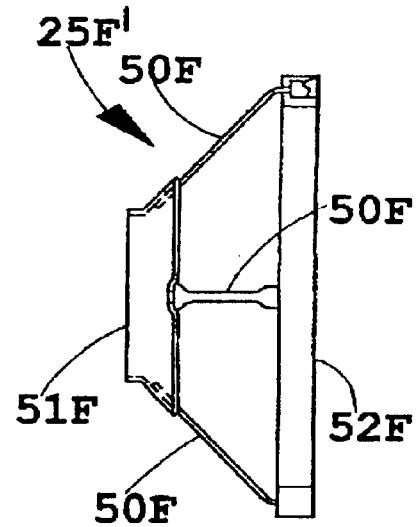

The modified support 25D' (FIGS. 8–9) has bodies 50D having a U-shaped cross section for increased stiffness. The U-shape extends from each body 50D onto the inner and outer pad flanges 67D. The enlarged pad flanges 67D and 67D' are shaped to permit a weld bead 68D to be formed along edges of the pad flanges 67D and 67D'. The modified support 25E' (FIGS. 10–11) is integrally formed from a single stamping, and has relatively flat bodies 50E that can flex in a direction parallel the longitudinal direction 63E of the catalytic converter 20. The modified support 25F' (FIGS. 12–13) has bodies 50F with deeply concave cross sections that are shaped to fit into mating pockets 68F in the inner and outer ring flanges 51F and 52F. Each of the supports 25D', 25E', and 25F' have dog bone shapes emphasizing particular functional characteristics and providing particular manufacturing and service durability characteristics.

Spoked Wheel Core Support

Figure 15:
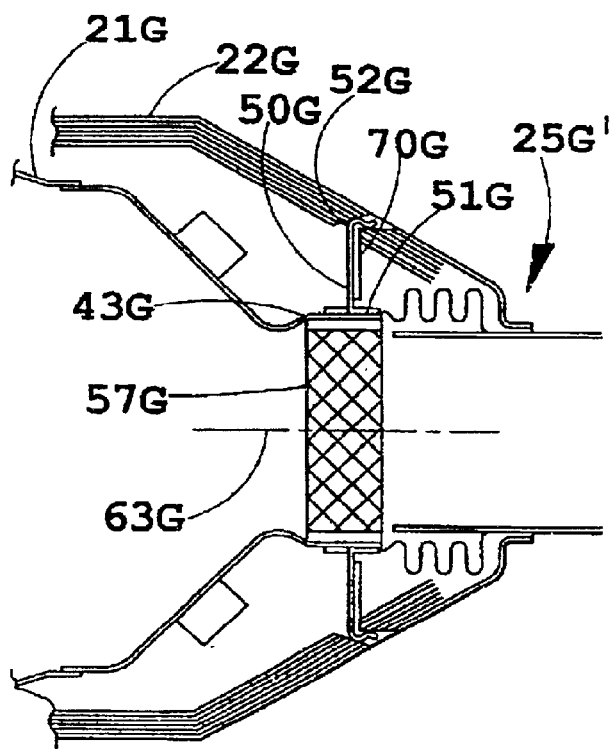
Figure 14:
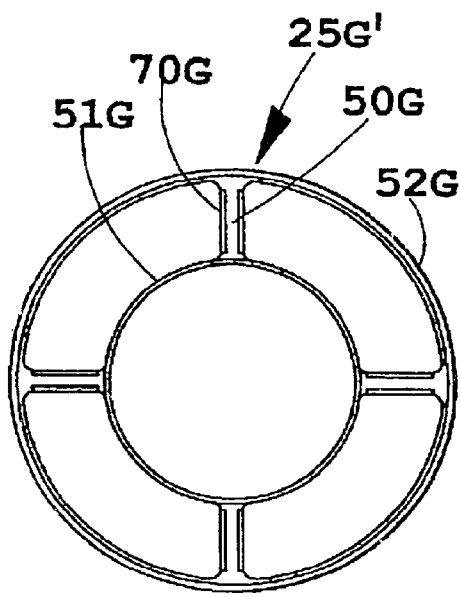

A spoked-wheel shaped support 25G' (FIGS. 14–15) includes four to eight spokes or bodies 50G that extend from its inner flange 51G to its outer flange 52G. The spokes 50G are oriented in the same radial plane as the inner and outer flanges 51G and 52G. The spokes 50G include stiffening webs 70G along their side edges, which permits a reduction in their cross-sectional thickness. The inner flange or hub 51G fits around the inlet tube section 43G at the disk or end shield 57G, and doubles as a bellows weld-reinforcing ring. The outer flange 52G engages the outer housing 22G with a leaf-spring like manner. This method of supporting the inner housing 21G and its catalytic converter core accommodates relative thermal expansion between the inner and outer housings 21G and 22G, provides excellent stability and strength for resisting dynamic loads (vibration), and resins the escape of heat stored in the inner housing 21G since the support is slightly outside the inner housing 21G. Also, the spokes 50G extend perpendicularly to the longitudinal directions 63G, such that they permit linear expansion along the longitudinal direction 63G. The inner and/or outer flanges 51G and 52G can be secured to the inner and outer housings 21G and 22G, or one of them can remain unattached and adapted to slip, to facilitate telescoping movement of the inner housing 21G relative to the support 25G'.

Figure 16:
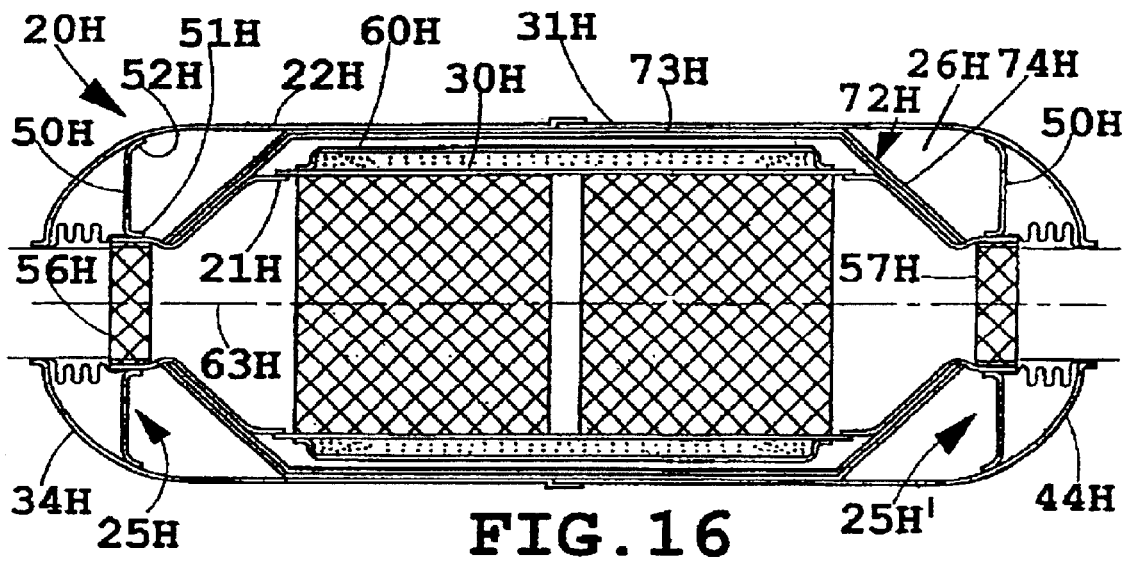
FIGS. 16 and 17 are side cross-sectional views of additional modified catalytic converters, FIG. 17 showing more undulations in its bellows versus FIG. 16 and also having a different placement of its radiation shield.
Figure 17:
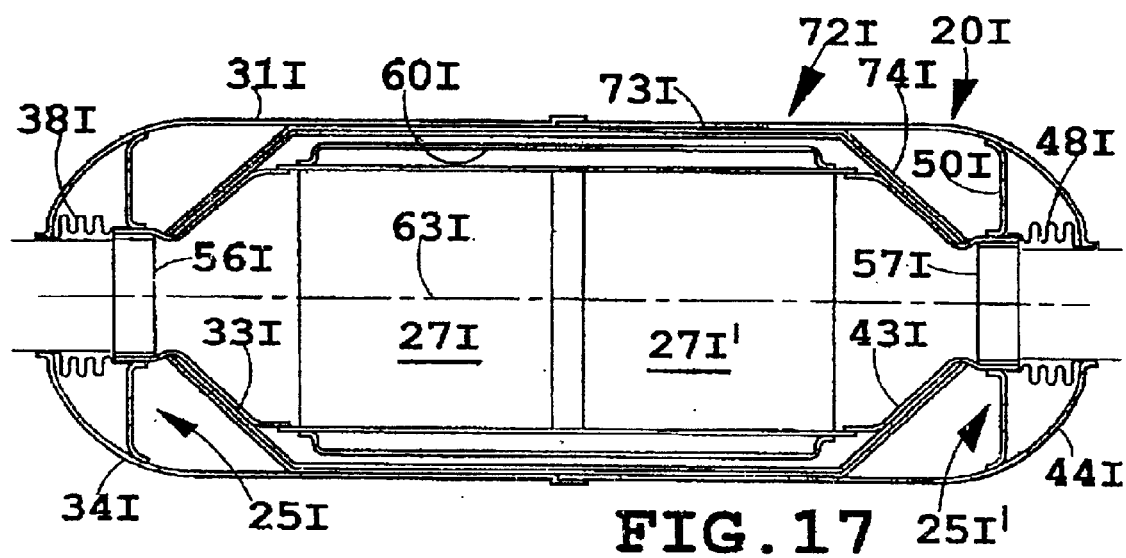
Figure 18:
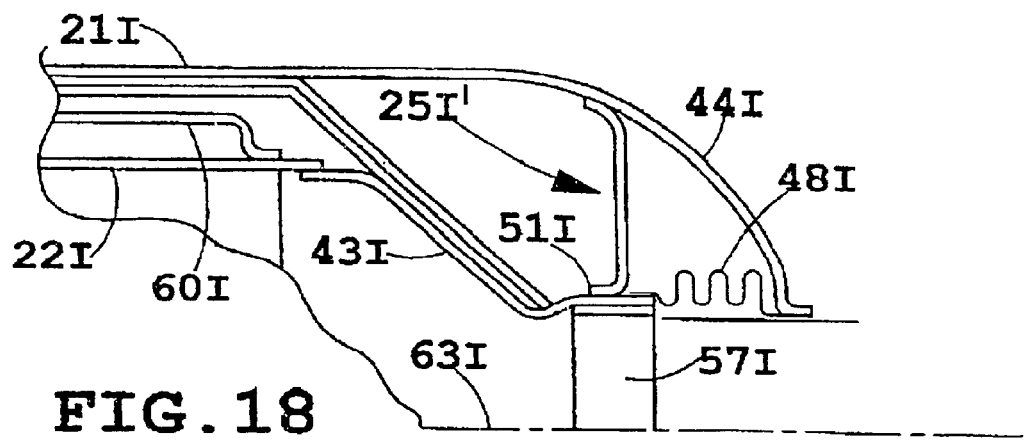
FIG. 18 is a fragmentary enlarged cross-sectional view of the modified catalytic converter shown in FIG. 17.
Figures 28, 29:
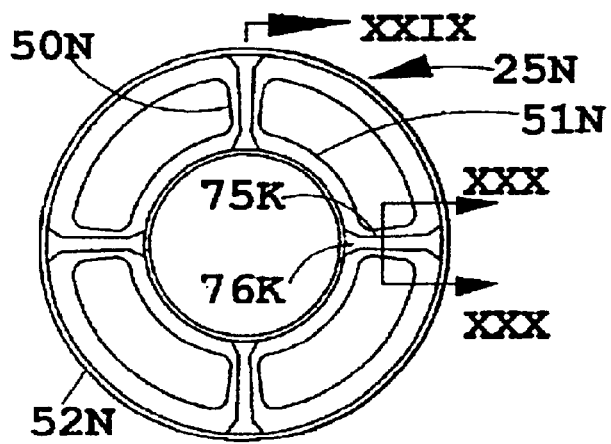
FIG. 28 is an end view of another modified support.
FIG. 29 is a cross-sectional view taken along the line XXIX—XXIX in FIG. 28.
Figures 30, 31:
FIG. 30 is a cross-sectional view taken along the line XXX—XXX in FIG. 28.
FIG. 31 is a cross-sectional view taken along the line XXXI—XXXI in FIG. 30.

The catalytic converter 20H (FIG. 16) includes modified supports 25H and 25H', where each support 25H and 25H' is a single stamping having spoke-like bodies 50H, an integral inner flange 51H and an integral outer flange 52H. The inner and outer flanges 51H and 52H are each bent in the same longitudinal direction 63H, and are installed so as to face in the direction of the inner housing 21H. The outer housing 22H has bullet-nose-shaped end cones 34H and 44H, and the outer flange 52H of the supports 25H and 25H' are shaped to mateably engage the inner surface of the end cones 34H and 44H. The bullet-nose-shaped end facilitates manufacture of the outer housing 22H by allowing the outer housing 22H to be made from a deep drawn process. A radiation shield 72H is provided in the cavity 26H. The radiation shield 72H extends completely around the inner housing 21H. Specifically, the radiation shield 72H includes a center section 73H that is positioned adjacent an inner surface of the sidewall 31H of the outer housing 22H, and includes conically shaped end sections 74H that extend along the inner end cones 33H and 43H. The radiation shield 72H has ends that terminate adjacent the disks or end shields 56H and 57H. The catalytic converter 20I (FIGS. 17 and 18) has a radiation shield 72I that is similar to radiation shield 72H, but radiation shield 72I has a center section 73I that is positioned adjacent the outer surface of the intermediate housing 60I and that is spaced from outer wall 31I. Also, the number of folds in the bellows 38I and 48I are increased to provide increased tolerance of longitudinal thermal expansion.

Figure 33:
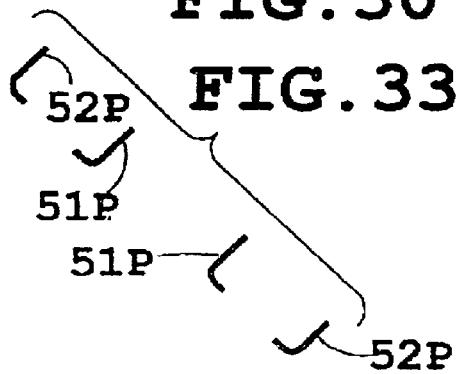
FIGS. 33 and 34 are cross-sectional views taken along the lines XXXIII—XXXIII and XXXIV—XXXIV in FIG. 32.
Figure 32:
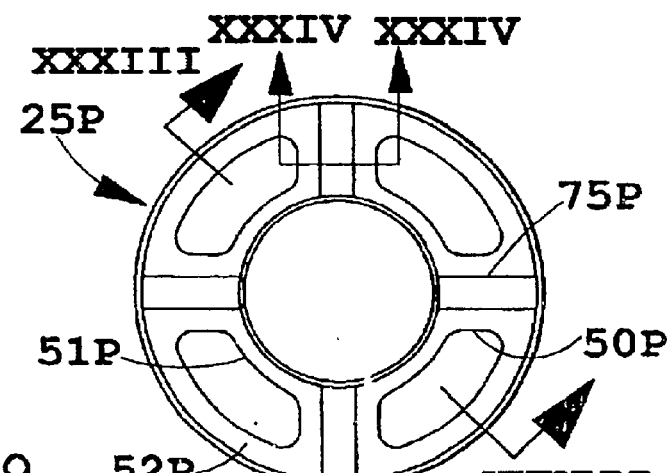
FIG. 32 is an end view of another modified support, FIG. 32 being similar to FIG. 28, but including no angled gussets at ends of its spokes.
Figure 35:
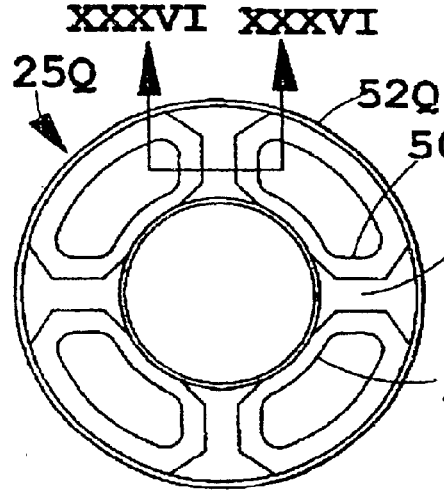
FIG. 35 is an end view of another modified support, FIG. 35 being similar to FIG. 28, but including edge flanges that extend from sides of its spokes.
Figures 34, 36:
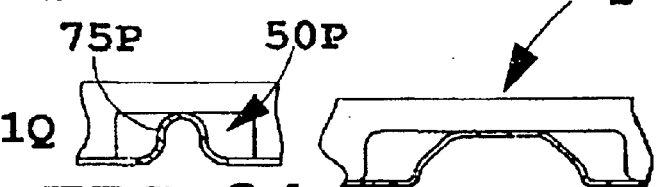
FIG. 36 is a cross-sectional view taken along line XXXVI—XXXVI in FIG. 35.

The support 25J (FIGS. 19–20) of the catalytic converter 20J (FIG. 20) is a single stamping, and has four spokes or bodies 50J connecting an inner flange 51J to an outer flange 52J. The spokes 50J are relatively wide for increased stability. The bellows 38J include unique non-uniform folds, with the innermost ones 38J' of the folds characteristically not contacting the inlet tube section 36J, but permitting the inlet tube section 36J to extend inwardly within the bellows 38J a significant dimension. The support 25K (FIG. 21) is similar to support 25J, but includes a ridge or stiffening bead 75K formed longitudinally along each spoke 50K, and further includes gussets 76K formed at each end of each spoke 50K (FIG. 22). The ridge 75K can be sharply formed to for a V-shape (FIG. 23) or can be generally radiused to form a U-shape (FIG. 24). It is contemplated that the ridge 75K will be U-shaped, and the gusset 76K V-shaped. Support 25L (FIG. 25) includes spokes 50L having edge webs 77L for reinforcement (FIG. 26). Support 25M (FIG. 27) includes spokes 50M that are non-linear in a radial direction. Instead the spokes 50M have a "small-like" curvilinear longitudinal shape, which adds to their length and accordingly reduces their conductance of heat. Support 25N (FIGS. 28–31), support 25P (FIGS. 32–34) and support 25Q (FIGS. 35–36) disclose additional modifications that can be made to re-distribute stress and provide different beat conductance properties.

Converter Internal Support/Ceramic Dog Bone Spoked End Support

Figure 37:
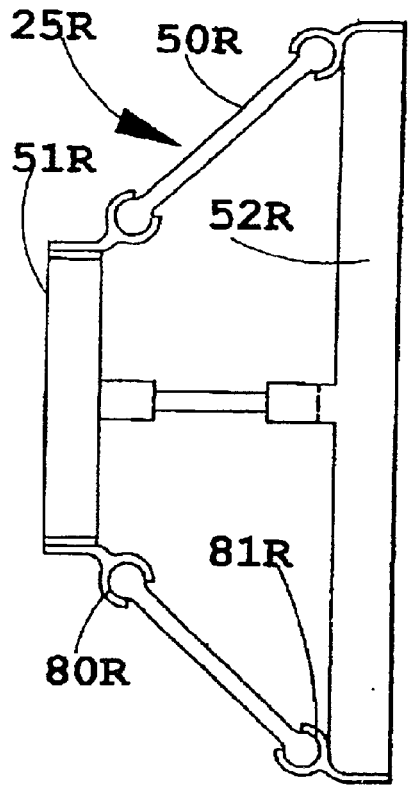
FIG. 37 is a side view of another modified support.
Figure 40:
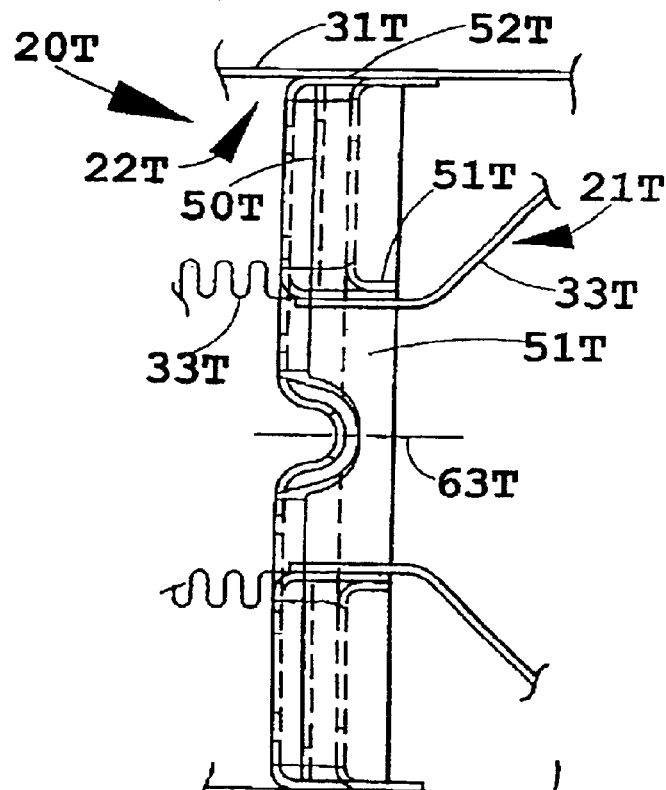
FIG. 40 is a side view of an end of another modified catalytic converter.

Support 25R (FIG. 37) includes a ceramic spokes 50R that span between inner and outer flanges 51R and 52R. The inner and outer flanges 51R and 52R have pockets 80R and 81R shaped to mateably rotatingly receive ends of the ceramic spokes 50R so that once assembled to the inner and outer housings (see inner and outer housings 21G and 22G in FIG. 15), the spokes 50R cannot be pulled out of the pockets 80R and 81R. The spokes 50R must be configured to rotate to and permit longitudinal/radial thermal expansion of the inner housing and so that they permit movement of the inner flange 51R relative to the outer flange 52R.

The dog bone ceramic spokes 50R act as a linkage from the hub inner flange 51R to the rim outer flange 52R. This design allows only rotational movement at the joints. This results only in axial loading (no bending) which helps durability. The hub and rim could be constructed with various stainless steel or Inconel steels at the hub or lower grade steels at the rim. Also a zirconium ceramic dog bone has very low thermal conductivity and high strengths. It is to support and position the converter core for high durability and minimum heat loss.

Converter Internal Support/Tubular Spoked End Support Design

Figure 39:
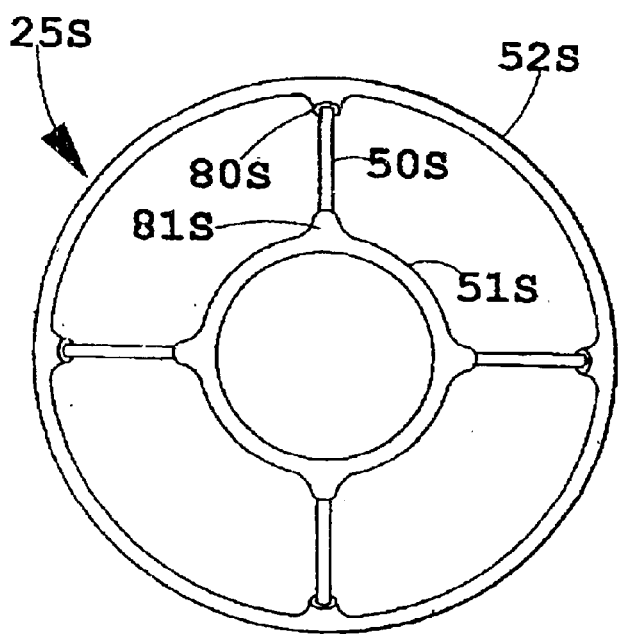
FIG. 39 is an end view of the modified support shown in FIG. 38.
Figure 38:
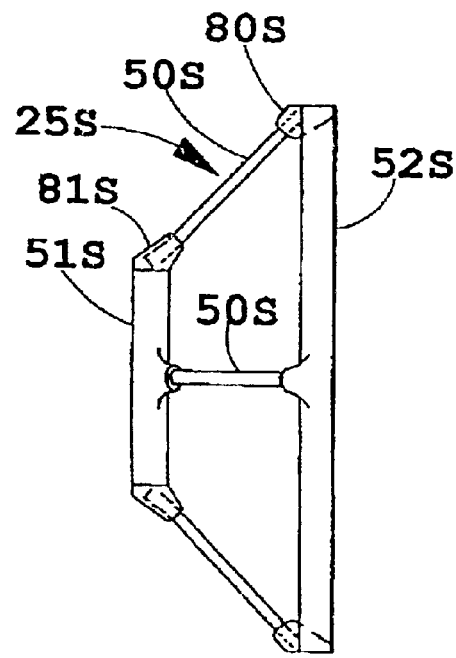
FIG. 38 is a side view of another modified support.
Figure 42:
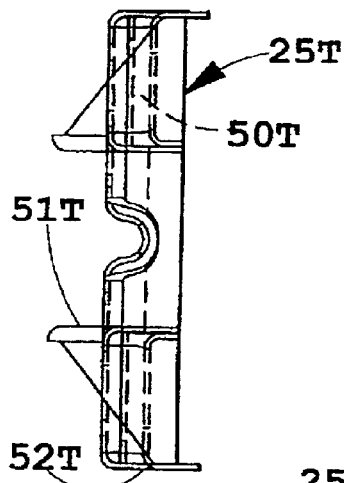
FIG. 42 is a side view of the modified support shown in FIG. 41.
Figure 41:
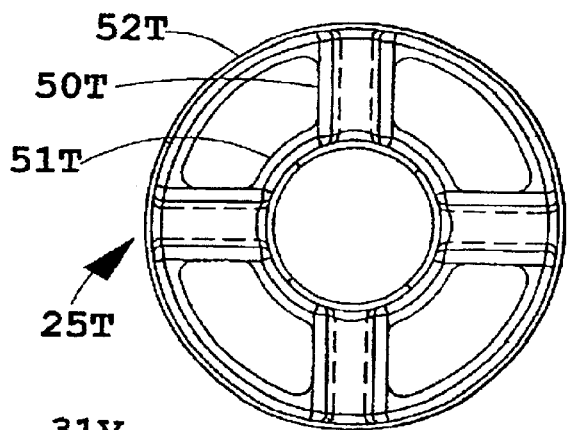
FIG. 41 is an end view of another modified support.

The support 25S (FIGS. 38–39) is very similar to support 25R, except that the support 25S includes tubular spokes 50S that telescopingly fit into pockets 80S and 81S. The same reasoning applies as for this design except that the tubular spokes 50S are a more precise form and all mating parts can be machined for accurate fit. This allows for a precisely built assembly with very small tolerances. The tubular spokes are joined to the hub and rim by brazing or welding. This can result in a very consistent product with good durability and life that is predictable. Notably, a solid rod could be used in place of the tubular spokes 50S. The rod could include hot-forged or cold-formed/flattened ends configured to attach to the inner or outer ring flanges.

Core Support/Spoked Wheel with Wire Mesh I.D. or O.D.

Figure 45:
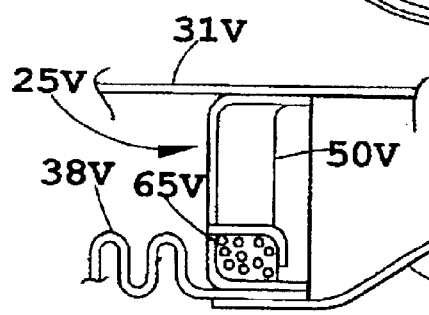
FIGS. 43–47 are fragmentary side cross-sectional views of additional modified catalytic converters incorporating different modified supports, FIG. 43 showing a basic modified support and FIGS. 44–47 showing modified support incorporating a wire mesh foot that slidably engages a housing wall.
Figure 43:
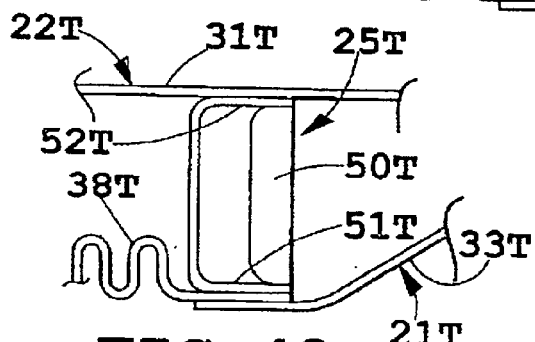
Figure 46:
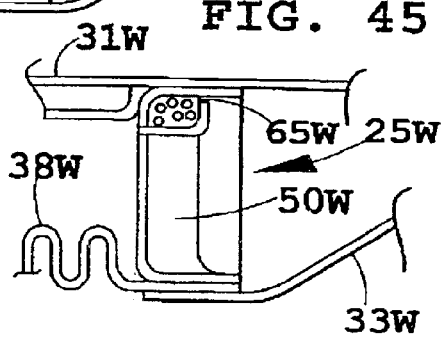
Figure 44:
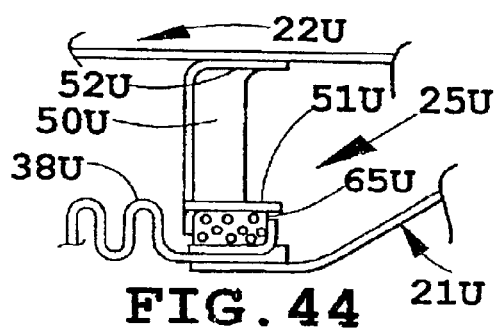
Figure 47:
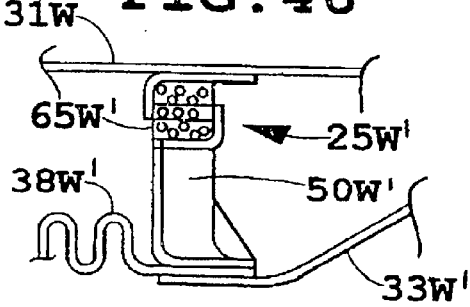
Figure 48:
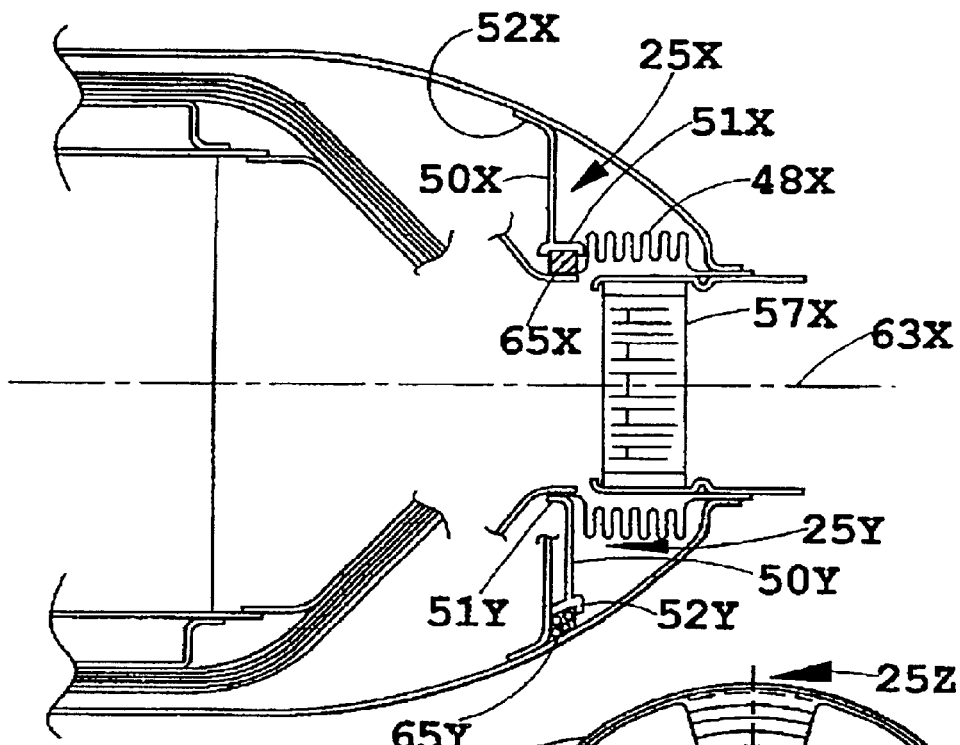
FIG. 48 is a fragmentary side cross-sectional view of another modified catalytic converter incorporating a modified support.

Support 25T (FIGS. 40–43) is a stamped/formed part having spokes 50T connecting inner and outer flanges 51T and 52T. The support 25T include four to eight spokes 50T. The support 25T as illustrated in FIGS. 40–43 is another modification similar to the supports of FIGS. 14–36. However, the support 25T is easily modified by changing a location of a wire mesh foot or by changing related support structure to become support 25U (FIG. 44) which includes an inner recess at the inner flange 51U for receiving a wire mesh foot 65U to engage the inner housing 21U, or to become support 25V (FIG. 45) which includes reversed wire-capturing flanges, support 25W (FIG. 46) which positions a wire-mesh foot slidably against the outer housing wall 31W, or support 25W' (FIG. 47), which includes a thicker foot. The supports 25U, 25V, 25W and 25W', include inner and outer flanges, such as flanges 51U and 52U, one of which is shaped to receive the wire mesh foot 65U, 65V, 65W, or 65W', respectively. In each of the supports 25U, 25V, 25W, and 25W', a perpendicular pocket-forming flange is formed to help contain the wire mesh foot. In FIG. 48, the upper half of FIG. 48 shows a support 25X where the inner flange 51X forms three sides of a pocket for holding the wire mesh foot 65X, while the lower half of the FIG. 48 shows a support 25Y where the outer flange 51Y forms three sides of a pocket for holding the wire mesh foot 65Y. A keeper flange on the mating side of the ring reacts with thermal and dynamic forces to hold the inner housing in position, yet permit thermal expansion.

Compliant Spokes Core Support

Figure 50:
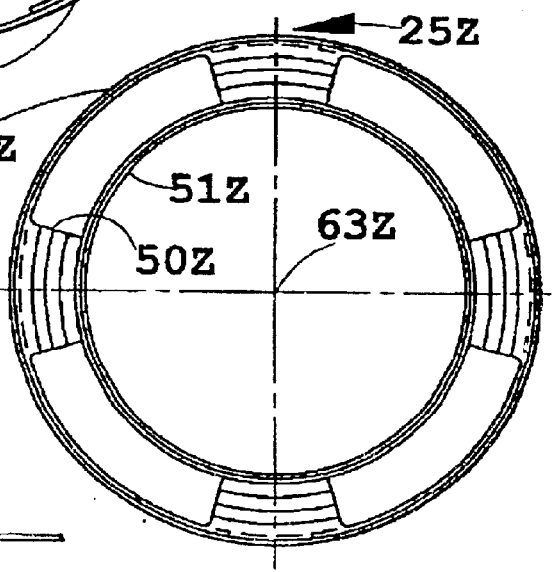
FIG. 50 is an end view of the modified support shown in FIG. 49.
Figure 49:
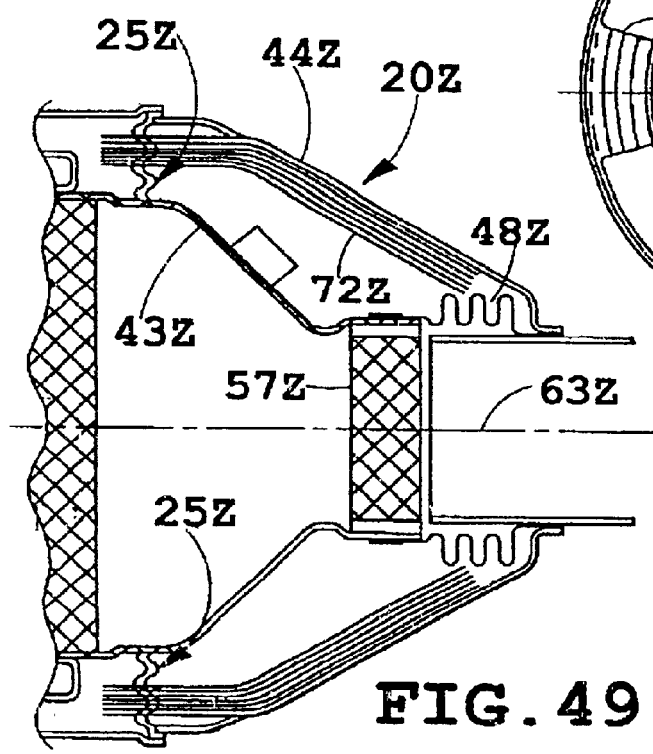
FIG. 49 is a fragmentary side cross-sectional view of another modified catalytic converter incorporating a modified support having circumferentially-extending waves formed therein.

The support 25Z (FIGS. 49 and 50) comprises a stamped/formed spoked wheel with four to eight spokes 50Z oriented in the radial plane. The spokes 50Z interconnect the inner and outer flanges 51Z and 52Z, and the spokes are corrugated to be compliant in the axial longitudinal direction, and rigid in the radial plane. The bends forming the corrugations extend circumferentially, and as illustrated, include four such bends. This method of supporting a catalytic converter core accommodates thermal expansion, reacts well with dynamic loads and resists the escape of heat stored in the core.

Catalytic Converter Internal Disk Spring End Support

The support 25AA (FIGS. 51–54) has a "disk spring" end support configuration. This support design is made of a premium material such as a heat-treated Inconel™ because of high strength at elevated temperatures, and lower thermal conductivity than stainless steels. Also, it has good spring properties in the axial direction like a thick wall disk spring used for unrelated purposes such as bolts or bearing preloads. The spoke 50AA may be "continuous", such that there are no apertures in the area of the spoke 50AA or it may include holes, such as the holes 51AA' that reduce conductive heat transfer of thermal energy through the spoke 50AA. The purpose is to support one end of the converter core. This design provides robust support for all loads in transverse direction, but allows flexibility in the axial direction, as illustrated by the dashed lines in FIG. 51. This design will be used in conjunction with a fixed end support at the opposite end of the converter core to handle axial loads. This disk spring design replaces several pieces in the dog bone end support designs containing end support, wire mesh, and mesh rings.

Catalytic Converter Internal End Support(s) with Improvements Such as One-Piece "Unitized" Hub and Spokes or Truss-Type Configuration The support 25BB and the support 25CC are examples of supports using truss-type spokes 50BB and 50CC. The spokes each extend at an angle to an axial planar direction, with each spoke extending at an angle opposite the adjacent spoke in a back and forth manner that is reminiscent of a truss. A support is placed at each end of the converter core. The spokes 50BB interconnect the inner and outer flanges 51BB and 52BB, the spokes 50CC interconnect the inner and outer flanges 51CC and 52CC, and the spokes 50DD interconnect the inner and outer flanges 51DD and 52DD. The support 25DD (FIGS. 61–65) is similar, but has spokes 50DD that extend longitudinally/radially. In the supports 25BB and 25DD, the inner flanges (51BB and 51DD) are integrally formed with the spokes (50BB and 50DD) as a single stamping. Any of several designs are developed so that any combination can be used on the two ends of the core. A premium material like Inconel is to be used for the hub and dog bone shape because it has very high strength at elevated temperatures, and lower thermal conductivity than other stainless steels. A minimum cross section would be utilized to keep heat loss to a minimum. Because the dog bone could be manufactured of various shapes, perhaps by stamping or other methods, an optimum shape can be designed, analyzed, tested and developed.

The design in FIGS. 63–65 significantly reduces the amount of expensive Inconel material utilized to manufacture hub and dog bones. Also, it eliminates one-half the total dog bone welds to make the end support. This shape reduces the number of components to build an end support. A one-piece "unitized" hub and spokes design improves the structural strength of the dog bone to hub area that was formerly welded. This permits the design to be durable with less spoke cross section, resulting in less heat loss. These designs will support and position the converter core for high durability and minimum heat loss.

Non-Symmetric Core Supporting Method

Figure 66:
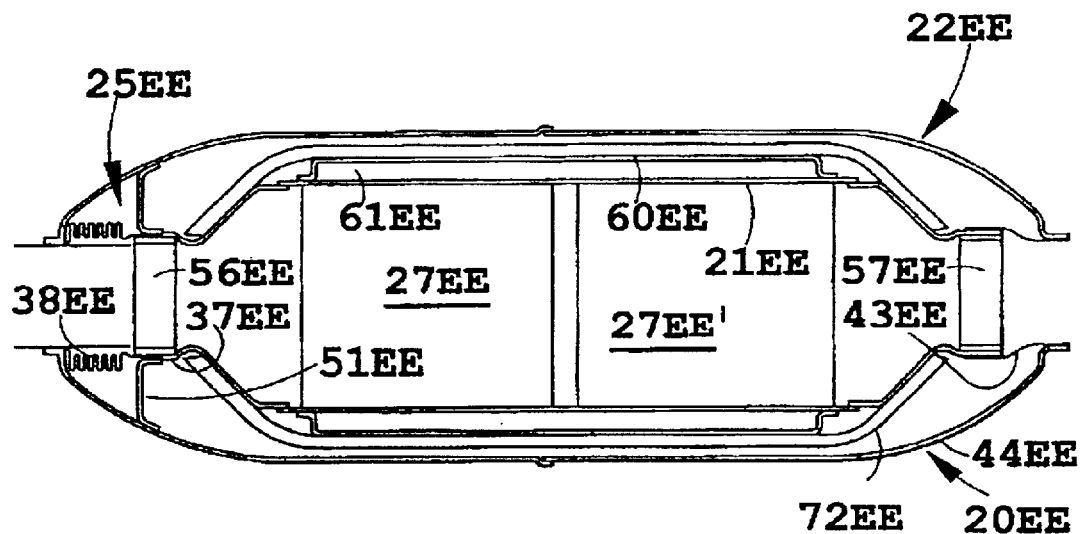
FIG. 66 is a side view of a modified support with a sliding support on the inlet and a fixed tube support on the outlet end.

A catalytic converter 20EE (FIG. 66) includes a support 25EE at one end of the inner housing 21EE, with other end being supported by the outlet tube 43EE. The outlet tube 43EE is made stiff, such that most, if not all, thermal expansion occurs at the inlet end of the inner housing 21EE. The support 25EE includes an inner flange 51EE that slidingly engages tube section 37EE of the inner inlet end cone 33EE and/or includes a flexible body 50EE that flexes as the inner housing 21EE thermally expands. A sufficient number of folds in the bellows 38EE are provided to accommodate the thermal expansion of the inner housing 21EE.

Wire Mesh Ring with Segmented Ceramic Feet

Figure 67:
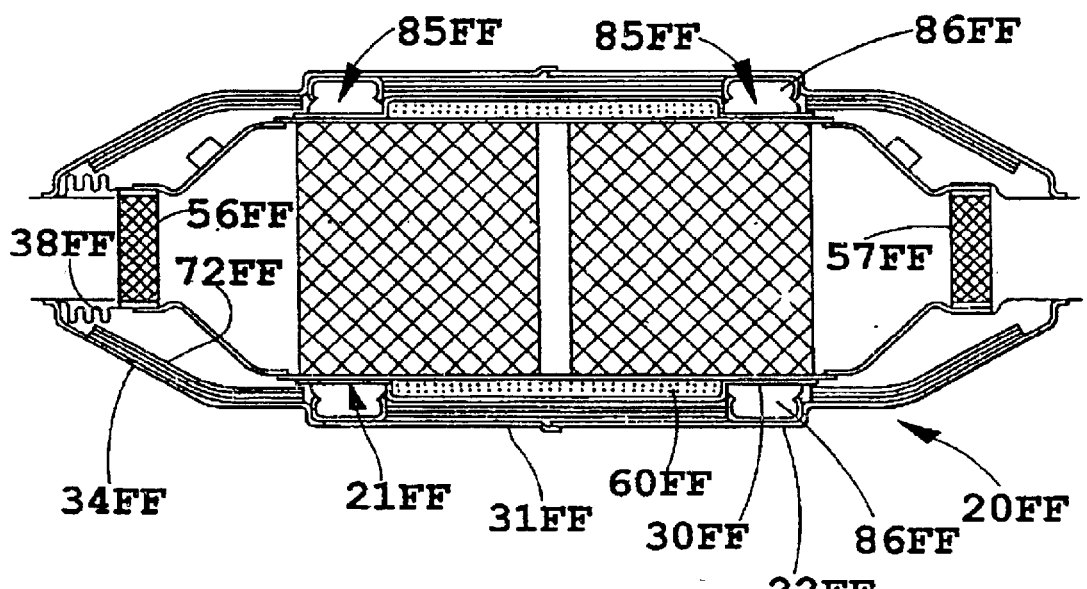
FIG. 67 is a side cross-sectional view of modified catalytic converter with housing-engaging intermediate supports.

The catalytic converter 20FF (FIG. 67) is similar to the catalytic converter 20EE in that it includes a bellows 38FF only at one end and no supports 25FF at either end. However, catalytic converter 20FF includes additional intermediate supports 85FF located at each end of the inner housing 21FF, with the supports 85FF slidingly engaging the sidewall 30 of the inner housing 21FF and the sidewall 31 of the outer housing 22FF. The intermediate supports 85FF include ceramic blocks carried by a wire mesh ring that abut the inner housing sidewall 30FF. A stop 86FF integrated in the outer housing sidewall 31FF captures the ceramic blocks on one side. An opposing stop integrated into 60FF captures the wire mesh ring on the other side. The intermediate housing 60FF is located between the stops 86FF. A radiation shield 72FF extends between the brackets or stops 86FF and along the interior surface of the outer housing 22FF. The wire mesh rings (FIG. 68) interrupt the radiation shield 72FF.

A support 85GG (FIGS. 69–70) includes a wire mesh ring 87GG with segmented ceramic feet 88GG (four to eight) provided on the inside diameter of the support 85GG. The feet 85GG are attached to the ring 87GG by crimping the wire mesh over recesses in the ceramic feet 88GG. Support rings 87GG are located inboard of the ends of the inner housing (21), at the outer ends of the sidewalls (30). This catalytic converter core support method accommodates relative thermal expansion between the core and jacket, reacts dynamic loads (hot vibration), and resists the escape of heat stored in the core.

Method Catalytic Converter Structure

A modified catalytic converter 20HH (FIG. 71) includes a support 25HH at its inlet end having an inner ring flange or hub 51HH, an outer ring flange or rim 52HH, and spokes 50HH connecting the hub 51HH to the rim 52HH. The outer ring flange 52HH has wire mesh feet 65HH that slidably engage the inner inlet tube section 36HH of the inner housing 21HH to permit longitudinal expansion of the inner housing 21HH to the outer housing 22HH without undesirable distortion of components. The catalytic converter 20HH further includes a support 25HH' at its outlet end having an inner ring flange or hub 51HH, an outer ring flange or rim 52HH, and spokes 50HH extending between the hub 51HH and the rim 52HH. The support 52HH' at the outer end provides a fixed support for the inner housing 21HH, such that the resulting greater longitudinal expansion of the inner hosing 21HH over the outer housing 22HH due to dissimilar thermal expansion occurs at the inlet end.

An end construction 90HH at the outlet end is particularly constructed to facilitate manufacture of the catalytic converter 20HH and to maintain a very good thermal barrier. The end construction 90HH includes a cylindrical wall extension 91HH that sealingly engages and is welded to the wall 31HH of the outer housing 22HH. The end consecutive 90HH further includes a separated and extended outlet tube section 92HH that extends from bellows 48H. The extended outlet tube section 92HH in effect replaces the inner outlet tube section (46) (FIG. 1) and serves a similar attachment function for connection to an exhaust pipe of the vehicle. First and second extended cone sections 93HH and 94HH extend from the wall extension 91HH. The cone sections 93HH and 94HH have ring-shaped inner end that overlap onto each other and onto the wall extension 91HH to form a rigid, sealed connection to the outer housing 22HH. The cone sections 93HH and 94HH have outer ends that are spaced apart from each other and that engage opposing ends of the extended outlet tube section 92HH. The cone sections 93HH and 94HH hold the outlet tube section 92HH in alignment with the bellows 48HH at an end of the bellow 48HH. The inner (i.e. second) cone section 94HH includes spokes or vacuum communication ports instead of comprising a continuous funnel-shaped member, but at least the first (i.e. outer) cone section 93HH is continuous and funnel-shaped so that the vacuum can be held in the cavity 26HH. The combination of the spokes 50HH and the cone sections 93HH and 94HH at the outlet end of the catalytic converter 20HH provide a very stable and sturdy structure, yet one which is highly thermally insulated.

A radiation shield 72HH is provided in three sections, including a center section 95HH that wraps around and covers the phase change material housing 60HH, and end sections 96HH and 97HH that wrap around and cover the inlet and outlet ends of the converter 20HH (including the bellows 38HH and 48HH). It is noted that the end sections 96HH and 97HH overlap onto longitudinal edges of the center section 95HH to provide maximum radiation-resisting values, yet to allow the spokes 50HH at each end to extend between the inner and outer housings 21HH and 22HH. The inlet end section of the catalytic converter 20HH is similar to the outlet end section, and its description need not be repeated in order for a person of ordinary skill to understand the present construction, or for such a person to understand the inventive aspects thereof.

The catalytic converter 20II (FIGS. 72 and 73) includes an outlet end section similar to that of catalytic converter 20HH, but the catalytic converter 20II includes a vacuum maintenance device 32II that includes getter material for maintaining a high vacuum in the cavity 26II. Alternatively, or at the same time, the vacuum maintenance device 32II may include hydride material for passively increasing the amount of hydrogen gas within the cavity 26II when the inner housing 21II heats up. By increasing hydrogen gas at high temperature, the insulative value of the vacuum cavity 26II is reduced, thus helping throw off heat and helping to prevent overheating of the catalytic converter 20II. By reducing hydrogen gas at low temperature, the insulative value of the vacuum cavity 26II is increased, thus assisting in faster heat up of the catalyst in the catalytic converter 20II during initial engine starts. Notably, the device 32II is positioned relative close to the inlet or outlet tube 92II such that it quickly receives heat from hot gases passing through the catalytic converter 20II. These hot gases are indicative of the temperature of the catalyst material in the catalytic converter 20II. As a result, the device 32II is able to quickly respond to actual temperature conditions of the catalytic converter material, which can be important to good operation.

In order to quickly and economically achieve a high vacuum in the cavity 26II, it is necessary to bake the catalytic converter 20II at high temperature so that gases and volatile agents are driven off. However, hydride materials, which release hydrogen at high temperatures, are undesirably activated to release their hydrogen at the same high temperatures necessary for a good bake-out. Further, after the bake-out, the cavity 26II must be sealed to maintain the vacuum. A problem occurs in that it is difficult to bake-out a cavity 26II and then seal the cavity 26II to maintain the high vacuum, without also prematurely activating the getter or hydride materials. The end construction shown in FIG. 72 solves this problem.

As shown in FIG. 73, the end construction of FIG. 72 replaces the outer end cone (93HH) with an inner ring flange 99II, an outer ring flange 100II, and a frustoconically-shaped member 101II (sometimes called a "cover"). The frustoconically-shaped member 101II includes an "in" flange 102II and an "out" flange 103II. The inner ring flange 99II is attached to an outer end of the extended outlet tube section 92II that extends from bellows 48II, and flares outwardly. The outer ring flange 100II is attached to the cylindrical wall extension 91II of outer housing 22II. The components of catalytic converter 20II are baked off as shown in FIG. 73. After bake-out, the "in" flange 102II is shaped to engage the inner ring flange 99II when the frustoconically-shaped member 101II is brought into engagement with the end of the outer housing 22II. The "out" flange 103II is shaped to simultaneously engage the outer ring flange 100II when the frustoconically-shaped member 101II is brought into engagement with the outer housing 22II. This simple movement of parts in a longitudinally aligned direction is easily achieved, even while the parts are continuously held in the high vacuum after bake-out. Once the frustoconically-shaped member 101II is engaged with the outer housing 22II, the bake-out temperature is increased sufficiently to melt brazing material 105II located on the "in" flange 102II to seal the "in" flange 102II to the inner flange 99II, and to melt brazing material 106II on the "out" flange 103II to seal the "out" flange 103II to the outer ring flange 100II.

The hydride and/or the getter material of device 32II is located on an inside of the body of the frustoconically-shaped member 101II. Notably, the frustoconically-shaped member 101II is separated from inner and outer housings 21II and 22I of the catalytic converter 20II and related components during the bake-out. By directing the heat of the bake-out at the inner and outer housings 22II and 22II and at the related components of that subassembly (and by keeping the subassembly that includes the hydride and getter materials at a cooler lower temperature), the properties and characteristics of the hydride and getter material are preserved so that they are not wasted. (i.e. The hydrogen in the hydride is not prematurely driven off, and the gas sorbing capacity of the getter is not prematurely used up.) Once the subassembly of the frustoconically-shaped member 101II is brought into engagement with the ring flanges 102II and 103II, additional heat is applied to the assembly that is focused to melt the brazing material 105II and 106II. It is noted that this additional heat may activate the getter material, but this is not a problem since the bake-out has already occurred and the cavity 26II is sealed. Thus, when the getter material cools and become active, it merely begins doing its intended job, which is to absorb gas to maintain the high vacuum. It is noted that this additional heat may also activate the hydride material, but this is not a problem since, as noted above, the bake-out has already occurred and the cavity 26II is sealed. Thus the hydride material merely begins doing its intended job, which is to release hydrogen into the cavity 26II when the hydride is at an elevated temperature.

Particulate Trap for Diesel Emissions

Figure 74:
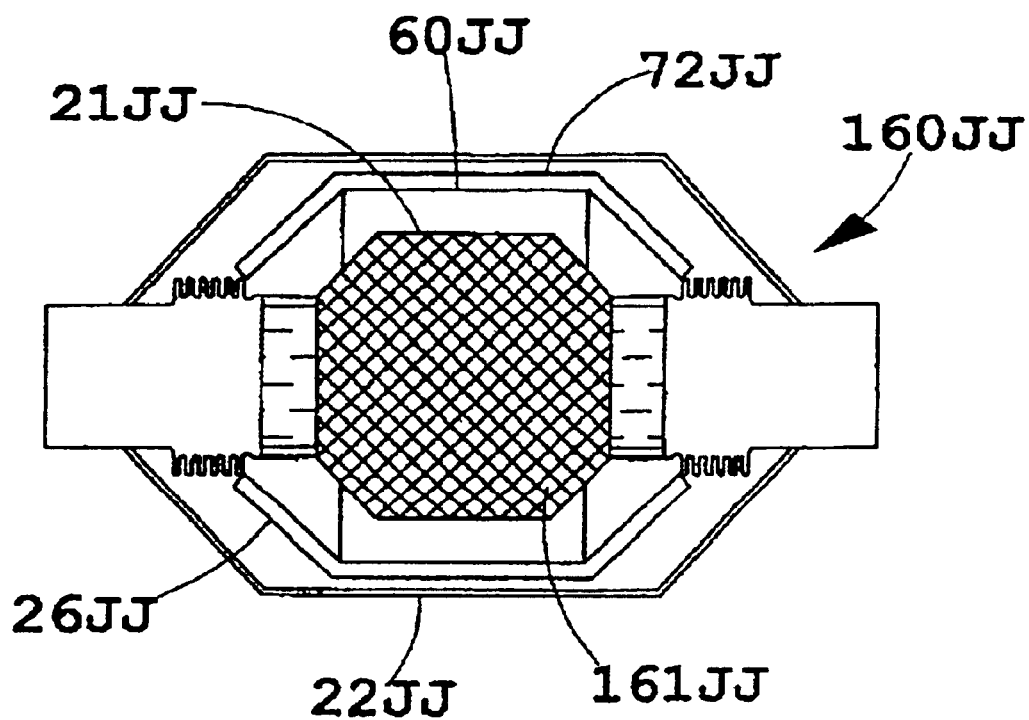
FIG. 74 is a schematic view of a particular trap incorporating aspects of the present invention.

A particulate trap 160JJ (FIG. 74) is often used to trap soot and carbon particulates in the exhaust from diesel engines, and to burn off these particles in a safe and non-polluting manner. The present technology can also be used in particular traps, as described below. The detail of particulate traps and their operation is not needed for an understanding of the present invention. It is sufficient to know that particulate traps require considerable heat and have a relatively high operating temperature for optimal operation. During cold starts, when the particular trap is cold, it is inefficient and does not operate effectively. Accordingly, all of the discussion above in regard to providing thermal control and management of the vacuum cavity applies, including the discussion relative to PCM materials, vacuum atmospheric/hydrogen control and insulative control, and reflective shields.

Particulate trap 160JJ is similar to the converter structure 20 in that the particulate trap 160JJ includes the inner and outer housings 211JJ and 22JJ spaced apart to define a vacuum cavity 26JJ. The inner and outer housings 21JJ and 22JJ include inlet and outlet ends where the exhaust is received and emitted, respectively. An intermediate housing 60JJ holds PCM material adjacent the inner housing 21JJ. Getter material is provided to maintain the vacuum in the cavity 26JJ for a long service life. Hydride materials are provided to emit hydrogen once an operating temperature is achieved, so that the particulate trap does not overheat. Radiation shields 72JJ are wrapped loosely around the intermediate housing 60JJ for reflecting heat energy to prevent undesired heat loss. It is to be understood that the cavity 26JJ can be actively or passively thermally managed. The thermally-activated particulate trap device 161JJ is located inside inner housing 21JJ, and potentially includes a regeneration method of fuel-fired thermal assist or fuel additive chemical assist to promote complete burning of the carbon particles and soot found in diesel exhaust.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The claimed invention is:

1. An exhaust treatment device for vehicles comprising:
    an inner housing having an inlet and an outlet defining a longitudinal direction and having a thermally-activated exhaust treatment device therein chosen to reduce emissions from the exhaust of a combustion engine as the exhaust passes from the inlet to the outlet;
    an outer housing enclosing the inner housing but characteristically not contacting the inner housing, the outer housing including an inlet and an outlet that align with the inlet and outlet of the inner housing, the inner and outer housings including walls forming a sealed cavity around the inner housing, the cavity having a vacuum drawn therein; and
    a support that supports the inner housing in the outer housing, the support including a radially-extending body and including a foot that engages at least one of the inner and outer housings, the foot including an insulative material different from the body, the insulative material being chosen to minimize conductance of heat.

2. The device defined in claim 1, wherein the support slidably engages one of the inner and outer housings.

3. The device defined in claim 1, wherein the foot includes an insulative material selected from one of wire mesh, ceramic, and a composite.

4. The device defined in claim 3, wherein the foot includes wire mesh.

5. The device defined in claim 3, wherein the foot includes ceramic pads.

6. The device defined in claim 4, wherein the foot includes a structurally-rigid high temperature stable insulative material.

7. The device defined in claim 1, wherein the foot slidably engages the one housing.

8. The device defined in claim 1, wherein the exhaust treatment device includes a catalytic material.

9. The device defined in claim 1, wherein the radially-extending body includes spokes.

10. The device defined in claim 9, wherein the spokes having a cross section chosen to provide strength to hold the inner housing in the outer housing without permitting contact between the inner and outer housings, but further being sized to minimize conductive head loss through the spokes from the inner housings to the outer housings.

11. The device defined in claim 10, wherein the spokes are made from a high nickel stainless steel that is greater than 30% nickel.

12. The device defined in claim 11, wherein the spokes have a cross section that is relatively thin in the longitudinal direction.

13. The device defined in claim 11, wherein the spokes include inner and outer ends, one of the inner and outer ends including wire mesh supporting the one end on the associated one of the inner and outer housings.

14. The device defined in claim 12, wherein the spokes include inner and outer ends, one of the inner and outer ends including ceramic pads supporting the one end on the associated one of the inner and outer housing.

15. The device defined in claim 9, wherein the spokes are made from an alloy steel material including nickel.

16. The device defined in claim 9, wherein the spokes are have a cross section that is less than about 1.5 mm in its narrowest dimension.

17. The device defined in claim 9, wherein the spokes include inner and outer ends, one of the inner and outer ends including wire mesh supporting the one end on the associated one of the inner and outer housings.

18. The device defined in claim 9, wherein the spokes include inner and outer ends, one of the inner and outer ends including ceramic pads supporting the one end on the associated one of the inner and outer housing.

19. The device defined in claim 9, wherein the spokes are flexible in a direction perpendicular to their length, such that the spokes flex to accommodate a relative increase in a length of the inner housing over the outer housing when the inner housing thermally expands significantly more than the outer housing.

20. The device defined in claim 9, wherein the spokes are elongated and have a length to width ratio of at least about 3 to 1.

21. The device defined in claim 9, wherein the spokes have a tubular cross section.

22. The device defined in claim 9, wherein the support comprises a one-piece component having an inner ring flange and an outer flange with the plurality of spokes extending therebetween.

* * * * *

UNITED STATES PATENT AND TRADEMARK OFFICE
CERTIFICATE OF CORRECTION

PATENT NO. : 6,884,398 B1
APPLICATION NO. : 09/889620
DATED : April 26, 2005
INVENTOR(S) : John P. Biel, Jr. et al.

It is certified that error appears in the above-identified patent and that said Letters Patent is hereby corrected as shown below:

Column 5,
Line 25, "view" should be --views--.
Line 36, "particular" should be --particulate--.

Column 6,
Line 59, "defines" should be --define--.
Line 60, "an/or" should be --and/or--.
Line 65, "release" should be --releases--.

Column 7,
Lines 41-42, after "angle" delete "of heat".

Column 8,
Line 50, "supports" should be --support--.

Column 9,
Line 24, "25B'" should be --25'--.

Column 10,
Line 8, "head" should be --heat--.
Line 44, "resins" should be --resists--.
Line 66, "drawn" should be --draw--.

Column 11,
Line 28, delete "for".
Line 34, "small-like" should be --snake-like--.
Line 39, "beat" should be --heat--.
Line 43, delete "a".

Column 12,
Line 24, delete "the".
Line 49, after "spokes" insert --50Z--.

Column 13,
Line 54, before "other" insert --the--.

Column 14,
Line 20, "feet 85GG" should be --feet 88GG--.
Line 29, "METHOD" should be --MODIFIED--.
Line 52, "consecutive" should be --construction--.
Line 54, "bellows 48H" should be --bellows 48HH--.

UNITED STATES PATENT AND TRADEMARK OFFICE
CERTIFICATE OF CORRECTION

PATENT NO. : 6,884,398 B1
APPLICATION NO. : 09/889620
DATED : April 26, 2005
INVENTOR(S) : John P. Biel, Jr. et al.

It is certified that error appears in the above-identified patent and that said Letters Patent is hereby corrected as shown below:

Column 16,
Line 28, "22I" should be --22II--.
Line 30, "22II and 22II" should be 21II and 22II--.
Line 34, "wasted. (i.e. The" should be --wasted (i.e., the--.
Line 45, "become" should be --becomes--.
Lines 58-59, "particular" should be --particulate--.
Line 64, "particular" should be --particulate--.

Column 17,
Line 6, "211JJ" should be --21JJ--.

Column 18,
Claim 10, line 15, "head" should be --heat--.
Claim 16, line 33, delete "are".
Claim 22, line 57, after "outer" insert --ring--.

Signed and Sealed this

Fifth Day of February, 2008

JON W. DUDAS
*Director of the United States Patent and Trademark Office*